US012280755B1

(12) United States Patent
Creed et al.

(10) Patent No.: US 12,280,755 B1
(45) Date of Patent: Apr. 22, 2025

(54) BRAKING CONTROL SYSTEM AND METHOD TO SYNCHRONIZE THE OPERATION OF THE BRAKING SYSTEM OF A TOWED VEHICLE

(71) Applicants: Russell Creed, West Hartford, CT (US); David Bailey, Riverview, FL (US)

(72) Inventors: Russell Creed, West Hartford, CT (US); David Bailey, Riverview, FL (US)

(73) Assignee: CREED Z.OLLC, New Britain, CT (US)

( * ) Notice: Subject to any disclaimer, the term of this patent is extended or adjusted under 35 U.S.C. 154(b) by 215 days.

(21) Appl. No.: 17/803,853

(22) Filed: Dec. 29, 2022

Related U.S. Application Data

(63) Continuation-in-part of application No. 15/932,947, filed on May 25, 2018, now Pat. No. 11,447,108.

(51) Int. Cl.
*B60T 7/20* (2006.01)
*B60T 8/17* (2006.01)
*B60T 13/72* (2006.01)

(52) U.S. Cl.
CPC .............. *B60T 7/20* (2013.01); *B60T 8/1708* (2013.01); *B60T 13/72* (2013.01)

(58) Field of Classification Search
CPC ........... B60T 7/20; B60T 8/1708; B60T 13/72
See application file for complete search history.

(56) References Cited

U.S. PATENT DOCUMENTS

| 6,837,551 B2* | 1/2005 | Robinson | B60T 13/74 303/7 |
|---|---|---|---|
| 11,447,108 B1* | 9/2022 | Bailey | B60T 8/172 |
| 2003/0168908 A1* | 9/2003 | Robinson | B60T 13/74 303/7 |
| 2007/0114836 A1* | 5/2007 | Kaminski | B60T 7/20 303/7 |
| 2015/0203087 A1* | 7/2015 | Ozsoylu | B60T 13/145 188/359 |
| 2017/0368897 A1* | 12/2017 | Brickley | B60W 50/14 |
| 2018/0126967 A1* | 5/2018 | Sanders | B60T 8/323 |
| 2018/0236988 A1* | 8/2018 | Shimanaka | B60T 7/20 |
| 2022/0379854 A1* | 12/2022 | Kulkarni | B60Q 1/46 |

* cited by examiner

*Primary Examiner* — Donald J Wallace
*Assistant Examiner* — Jalal C Coduroglu
(74) *Attorney, Agent, or Firm* — Arthur W. Fisher, III

(57) ABSTRACT

An auxiliary brake system to control the operation of the brake system of a towed vehicle having logic and circuitry to autonomically purge the vacuum from the vacuum assist brake system of the towed vehicle once the auxiliary brake system is installed and set-up in the towed vehicle including a plurality of sensors to sense and generate corresponding operating signals of various engine operating conditions of the towed vehicle indicating engine operation or voltage changes indicative of engine operation wherein the operational signals are fed to a controller to initiate a multi-phase vacuum purge of the towed vehicle brake system once an engine operation is sensed.

18 Claims, 17 Drawing Sheets

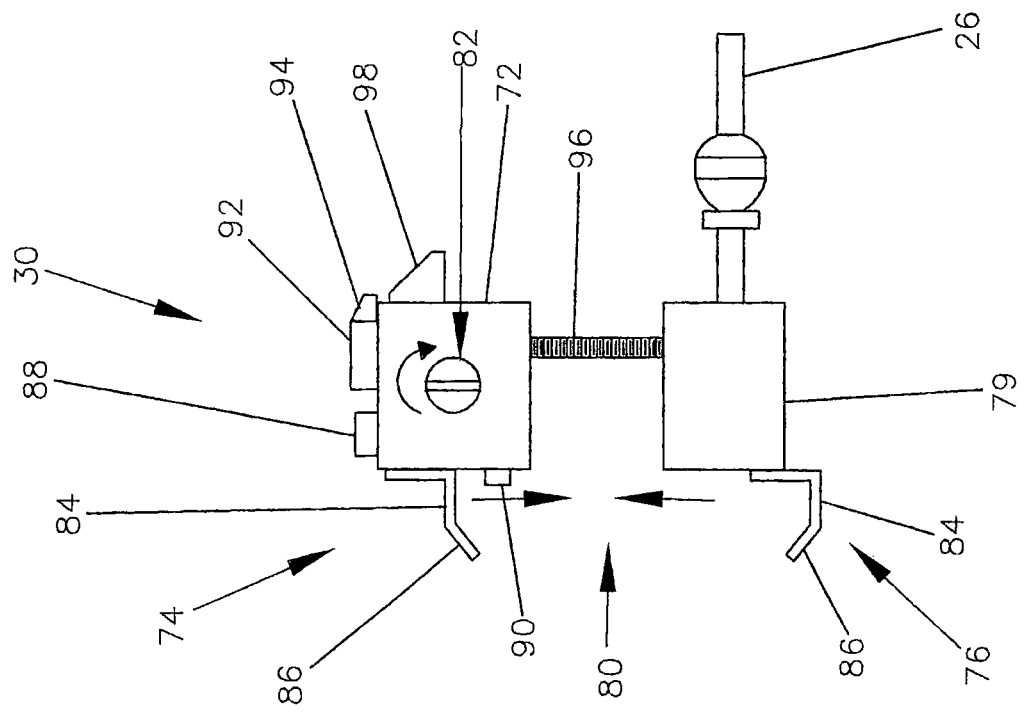
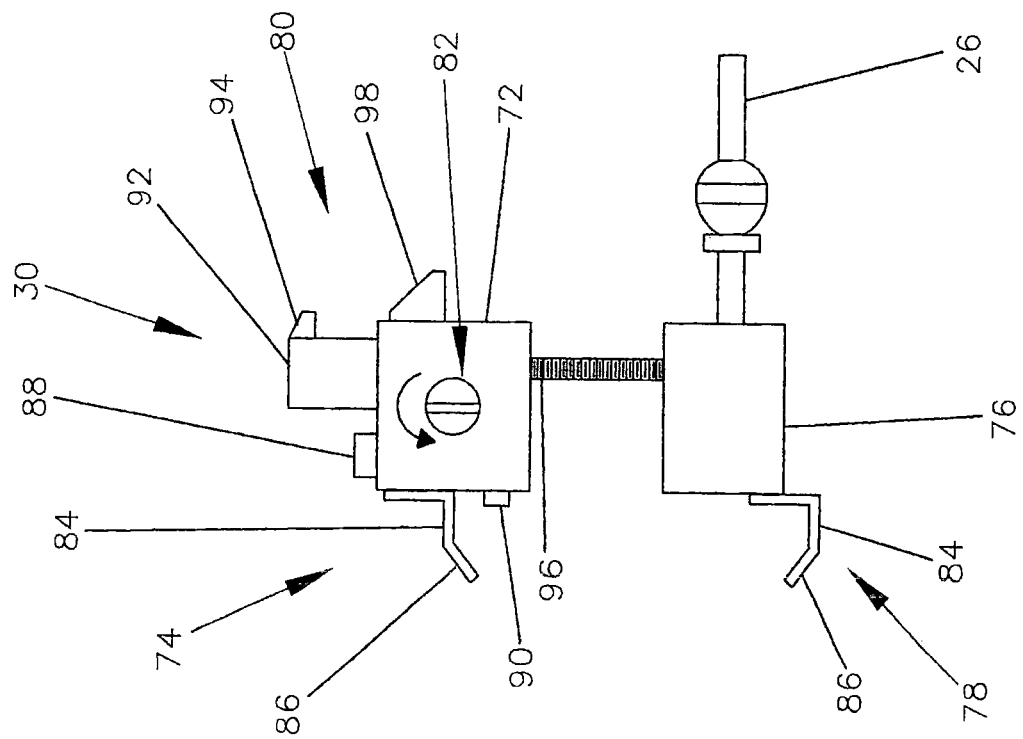

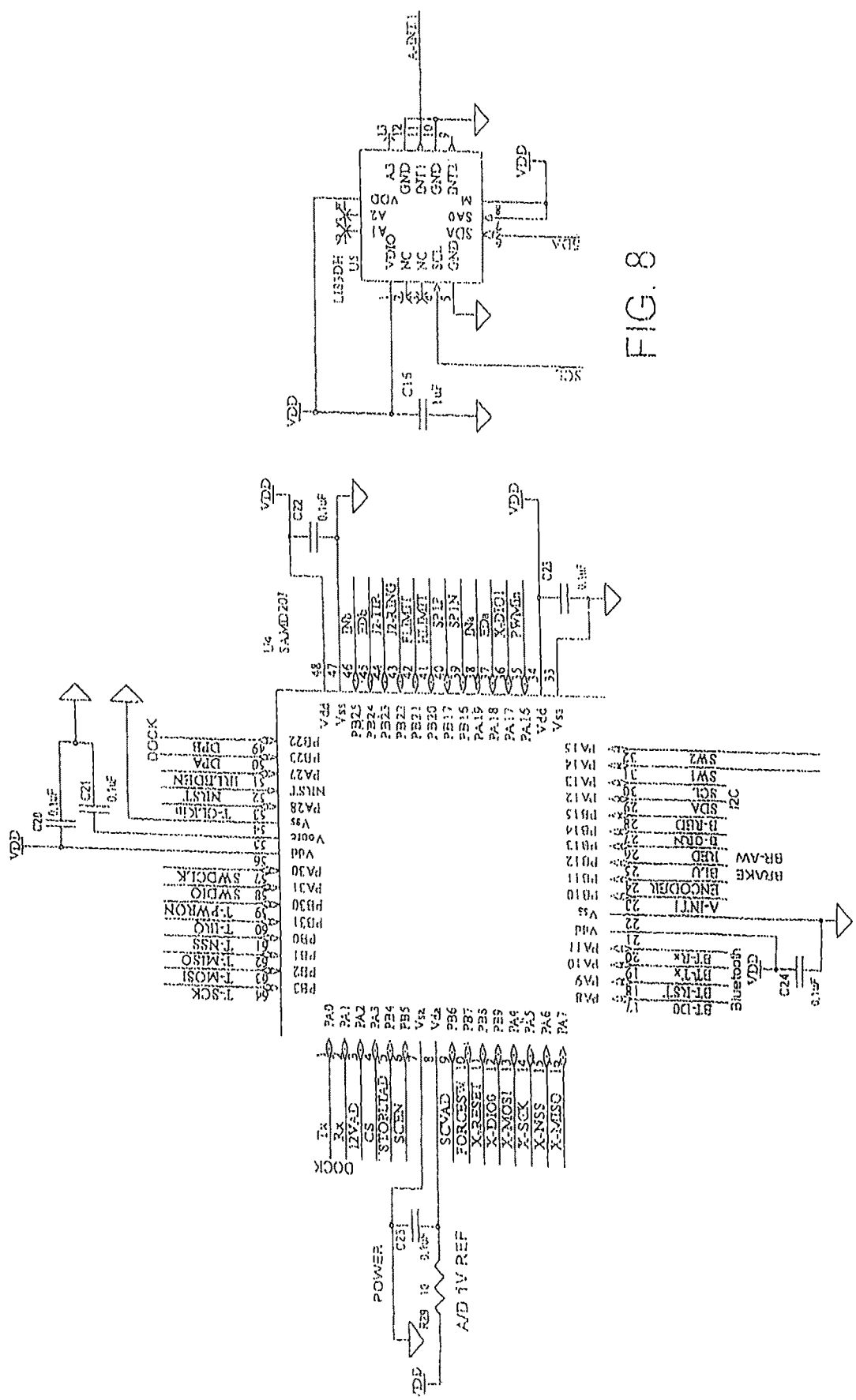

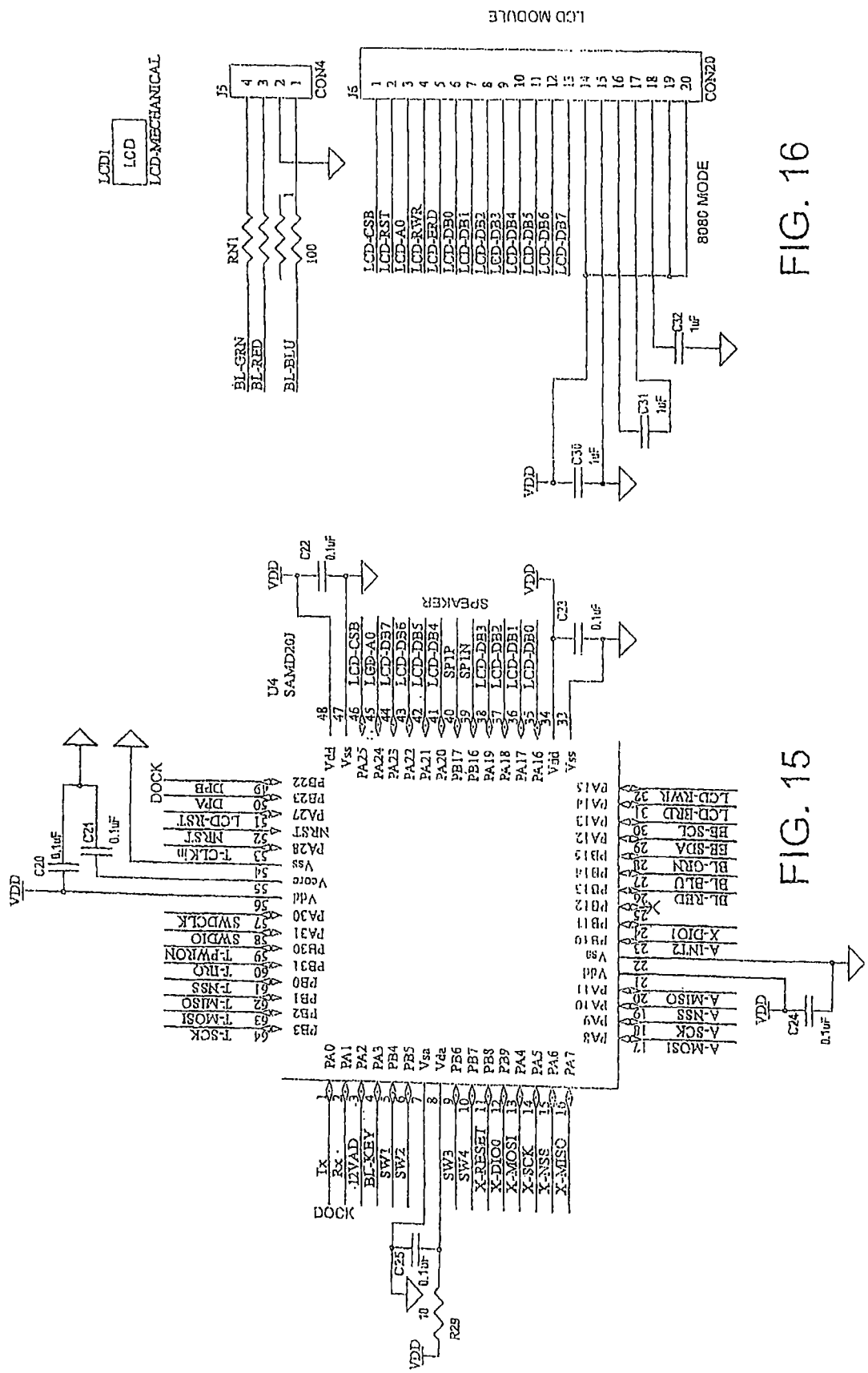

BRAKING CONTROL SYSTEM AND METHOD TO SYNCHRONIZE THE OPERATION OF THE BRAKING SYSTEM OF A TOWED VEHICLE

CROSS-REFERENCE

This application is a continuation-in-part application of utility application Ser. No. 15/932,947 filed May 25, 2018 that claims priority of provisional application Ser. No. 62/707,394 filed Oct. 30, 2017.

BACKGROUND OF THE INVENTION

Field of the Invention

An auxiliary brake system to selectively purge the vacuum from the brake system of a towed vehicle.

Description of the Prior Art

Often recreational vehicles, motor homes, trucks, and the like tow a smaller vehicle hitched thereto. The combined weight of the towing vehicle and towed vehicle creates a dangerous braking condition when using only the towed vehicle brake system.

This increased mass impacts both the stopping distances and time, as well as creates excessive wear on the brakes of the towing vehicle. Further, the mechanical connection between the towing vehicle and the towed vehicle is overly stressed.

Furthermore, ABS systems present a contamination problem when being towed. These ABS systems are rendered inoperative when the fluid level decreases. As such, these ABS brake systems can cause faults in their computer programs and operation of the brake and traction systems.

Of particular note, failure to insure the vacuum assist brake system of the towed vehicle is evacuated can easily result in an excessive braking force during a braking event that damages the brake system of the towed vehicle.

The prior art may have sought to remedy this problem. In one such remedy, each time a vehicle is to be towed, a device is inserted into that vehicle to operate its braking system, or to substitute for its braking system. The device is then connected to the braking system of the towing vehicle through hydraulic, high pressure air, or vacuum lines. Though more effective than having no contribution to overall braking from the towed vehicle, these remedies rarely approach the ideal, in which no additional load is placed on the towing vehicle's brakes. Further, in order to independently operate the towed vehicle, the installed braking device must be removed, as well as the hydraulic, air or vacuum lines. The inconvenience of repeatedly installing and removing braking devices and cumbersome lines has limited the acceptance of these types of prior art systems. Additionally, the required connection and disconnection may result in air or other contamination of the closed brake systems, rendering them inoperative.

Specific examples of the prior art are discussed below.

U.S. Pat. No. 6,501,376 relates to a method and apparatus for data exchange between a towing vehicle and an attached trailer using transmission/receiving modules contained in the towing vehicle and in the trailer. The transmission/receiving module of the towing vehicle transmits an identification signal, and at the same time, changes the electrical status of a connection line between the towing vehicle and the trailer. If the transmission/receiving module located in the trailer recognizes the change in the electrical status of the connection line simultaneously with receiving the transmitted identification signal, the identification signal is stored within the trailer. In subsequent communications between the towing vehicle and the trailer, the identification signal is transmitted before the message. As such, only the attached trailer, with the appropriate stored identification signal, can communicate with its towing vehicle.

U.S. Pat. No. 6,608,554 shows an apparatus and methods for data communications associated with a heavy duty vehicle including at least one electronic subsystem and a plurality of electrical conductors connected to the at least one electronic subsystem. A vehicle data communications protocol converter is connected to the plurality of electrical conductors for converting a first data communications protocol associated with data communications along the plurality of electrical conductors to a second data communications protocol such as an infrared or an RF data communications protocol.

US 2015/0203087 describes a boost arrangement for pressurizing a master cylinder of a vehicle braking system of a vehicle including a boost chamber containing brake fluid, a primary piston and a secondary piston. The primary piston including an opening and disposed in the boost chamber. The secondary piston includes an end extending into the opening of the primary piston.

U.S. Pat. No. 6,837,551 relates to a brake controller to control the brakes of a towed vehicle including a control module and a power module. The control module includes with an accelerometer and a microprocessor which polls the accelerometer and sends braking information to the power module. The control module is also provided with a gain control to adjust the amount of brake force information, a manual braking lever and a display panel.

US 2018/0236988 discloses a brake controller for a tractor and a trailer combination. The brake controller includes a first braking unit to control a first brake device, a second braking unit to control a second brake device, a distance sensor that detects a distance between the vehicle and an object, an execution unit that controls the first braking unit and the second braking unit in accordance with the distance detected by the distance sensor and executes an automatic brake control, and a prohibition unit that prohibits the execution unit from executing the automatic brake control. The brake controller prohibits execution of the automatic brake control under the condition that the tractor and the trailer are coupled to each other and the second braking unit includes a failure.

US 2018/0126967 shows a system and method for braking a flat-towed vehicle based upon a braking pressure of a braking fluid in a braking circuit in the towing vehicle including measuring the piezoresistor voltage drop across a piezoresistor positioned within the braking circuit such that the piezoresistor voltage drop changes in response to the braking pressure within the braking circuit. Based upon the measured piezoresistor voltage drop, a motor frame duration is retrieved.

U.S. Pat. No. 6,609,766 shows a progressive and proportional braking system for use with a towed vehicle utilizing the towed vehicle's existing vacuum power assisted braking system.

U.S. Pat. No. 8,430,458 discloses an auxiliary braking system located in a towed vehicle for braking the towed vehicle including a remote control to selectively communicate with an auxiliary braking unit in a towing vehicle. The auxiliary braking system allows the operator of the towing vehicle to assess the functioning of the auxiliary braking unit. In addition, the operator is able to remotely effect real time adjustments to the operating parameters of the auxiliary braking system while driving.

US 2006/0071549 relates to a electronic controlled vacuum powered brake system for a towed vehicle such as a boat, horse, travel, fifth wheel and utility trailers comprising a vacuum power assisted master cylinder with two outlet ports of hydraulic power, a vacuum pump, a solenoid, an electronic power module and a dash control module. The power brake unit is directly connected by lever arm to the solenoid of the towed vehicle.

US 2004/0160117 shows an auxiliary braking apparatus configured for use with a towed vehicle comprising a solid state inertia device to sense changes in inertia attributable to the braking of the towing vehicle. The auxiliary braking apparatus includes a reservoir constructed from a two step injection molding process thereby lowering overall manufacturing costs of the braking apparatus as well as improving the ability of the reservoir to be directly mounted to the housing of the braking apparatus.

U.S. Pat. No. 6,126,246 relates to towed vehicle braking systems including a compressor to drive a fluid actuator with a piston attached to the towed vehicle's brake actuator; e.g., a brake pedal or hand grip. The braking system is actuated by either a towed vehicle velocity decrease sensor, separation or distance between the towed vehicle and the towing vehicle sensor and/or coded signals from a radio transmitter operated by the driver of the towing vehicle to control the braking system of the towed vehicle.

Additional examples of the prior art are found in U.S. Pat. No. 6,631,636; US 2012/0102940 and 2013/0253814.

While some of the prior art may contain similarities relating to the present invention, none teaches, suggests or includes all of the advantages and unique features of the invention disclosed hereafter.

SUMMARY OF THE INVENTION

The present invention relates to a brake control system and method to synchronize the braking of a towed vehicle and a towing vehicle and to selectively purge vacuum from the brake system of the towed vehicle comprising a braking device located between the driver's seat and brake pedal of the towed vehicle and a remote device that is a portable device movable from the towed vehicle during installation and set-up of the braking control system to the towing vehicle during operation of the brake control system.

There is a potential that an auxiliary brake system installed in a towed vehicle may damage the vacuum assist brake system during a braking event when the towed vehicle is in tow if the vacuum is not purged. Thus, it is essential that vacuum be appropriately purged from such vacuum assist brake systems present in many towed vehicles. For example, when under tow the towed vehicle fluids need to be circulated periodically requiring periodic engine operation. The operation of the engine, of course, creates the vacuum in the vacuum assist brake system. Thus, there is a reoccurring need to purge the system.

The braking device comprises an enclosure to house a brake control including braking control electronics circuitry and processor software and an electric actuator drive motor.

A linear actuator arm movable between a retracted position and extended position in response to G force exerted on the towed vehicle extends outwardly from the front wall of the enclosure and is coupled between the electric brake actuator motor and a brake pedal coupler disposed outside the enclosure to secure the linear actuator arm to the brake pedal of the towed vehicle.

Extension and retraction of the linear actuator arm by the electric brake actuator motor to apply the braking force to the brake pedal is controlled by the brake control to selectively depress and release the brake pedal of the towed vehicle proportionally or in synchronization with the towing vehicle deceleration or acceleration.

The brake control comprises a brake microcontroller including digital and communication circuitry to receive and transmit signals to operate the electric actuator drive motor and to communicate with the remote device.

Specifically, the brake microcontroller includes electronic components, logic circuitry and software to receive signals and power from the other elements and components of the braking device and to generate control signals, status signals and operating signals fed to the various elements and components of the braking device and to communicate with the remote device.

Power is supplied to the braking device by a primary power source charged to about nominal 18 volts and a secondary power source charged to about nominal 12 volts.

The electric brake actuator motor is powered through an integrated motor driver circuit controlled by the brake microcontroller.

The amount of current value fed to the integrated motor driver integrated circuit and the electric brake actuator motor is measured by a current sensor. The current sensor is also connected or coupled to the brake microcontroller to feed real time current values to control the applied braking force calculated by the brake microcontroller in response to the G force exerted on the towed vehicle.

The position of the brake pedal coupler and the linear actuator arm relative to the fully retracted position directly correlates or corresponds to the applied braking force detected by an applied braking force detector implemented in one of several ways. For example, a motor encoder senses and reads or counts the number of revolutions or turns of the electric actuator drive motor when extending or advancing the linear actuator arm from the fully retracted position to the linear position corresponding to the required applied braking force calculated by the brake microcontroller.

Thus the force applied on the brake pedal by the brake pedal coupler and the linear actuator arm is calculated by the brake microcontroller as a function of the number of revolutions or turns of the electric actuator drive motor counted by the motor encoder.

Alternately, a mechanical force sensor such as a strain gauge mounted on the linear actuator arm detects or senses directly the applied force exerted on the brake pedal by the linear actuator arm. The applied force is fed to the brake microcontroller to control the extension and retraction of the linear actuator arm corresponding to the calculated applied force relating to the G force measured by the brake inertia sensor.

In other words, as the force applied to the brake pedal in the towing vehicle increases or decreases the electric brake actuator motor extends or retracts the linear actuator arm by rotating the number of revolutions or turns of the electric brake actuator drive motor corresponding to the number of revolutions or turns corresponding to the real time applied force determined by the brake microcontroller.

Alternately, as the towing vehicle accelerates or decelerates, the brake inertia sensor senses real time G force exerted on the towed vehicle and feeds a G force signal to the brake microcontroller to extend or retract the linear actuator arm and brake pedal coupler to the linear position or distance correlating or corresponding to the real time force corresponding to the measured or sensed G force.

The brake interface or input control panel is coupled to the brake microcontroller to set-up and operate the brake control device.

As previously described, the brake inertia sensor such as an accelerometer is coupled to the brake microcontroller to sense and feed real time G force information exerted on the towed vehicle to the brake microcontroller as the speed of the towed vehicle increases or decreases as the speed of the towing vehicle increases or decreases. In turn, the brake microcontroller logic and software generates the braking force to be applied to the brake pedal as the linear actuator arm and brake pedal coupler are extended or retracted by the electric actuator drive motor.

Digital packet and configuration data are communicated between the brake microcontroller and a remote microcontroller through a brake transceiver and a remote transceiver. Periodically, data packets and switches events are also transmitted between the brake transceiver and the remote transceiver.

To install the braking device in the towed vehicle, the driver's seat is adjusted to provide space for the braking device to be placed on the floor of the towed vehicle between the brake pedal and the front of the driver's seat. The brake pedal coupler is then secured to the brake pedal clamping the upper clamp member and lower clamp member together.

With the brake pedal coupler secured to the brake pedal, the driver's seat is moved forward against the braking device. When the braking device is properly positioned, the driver's seat should not exert pressure on the braking device or brake pedal.

Once the braking device is properly positioned and secured in place, the power supply connector and power cord are connected or coupled to the power receptacle of the towed vehicle.

Initially, when the power button is depressed an indicator light blinks repeatedly.

The braking device may be configured using the remote device button(s).

When the braking device is configured and with power supplied to the brake device, a set-up button or switch is depressed energizing the electric brake actuator motor partially extending the linear actuator arm from the fully retracted position depressing the brake pedal to partially deplete a portion of the vacuum from the vacuum power assist brake system and to verify that the brake actuator extension is within the range of motion of the linear actuator arm.

After the braking device is configured and set-up, a predetermined number of braking cycles apply only partial braking forces of the calculated applied braking force to further purge the vacuum power assist brake system. The amount of force applied by the linear actuator arm and brake pedal coupler to the brake pedal is proportional to the deceleration or acceleration G force sensed by the brake inertia sensor accelerometer. For example, if the maximum force capable of being applied at 1G is 90 pounds programmed into the brake microcontroller by the remote control then a 45 pound force will be applied to the brake pedal at ½ G deceleration and a force of 67.5 pounds would be applied to the brake pedal when the deceleration is ¾ Gs. The electronic circuitry and software of the brake microcontroller calculates the amount of force that correlates or corresponds to real time G force to be applied on the towed vehicle and generates a control signal to the electric brake actuator drive motor.

The force applied by the brake device to the brake pedal is controlled by the amount of current fed to the electric brake actuator drive motor through the integrated motor driver integrated circuit of the brake microcontroller. The applied force is monitored real time or sensed by the force sensor that is either the mechanical force sensor or by the motor encoder that senses the revolutions of the electric actuator drive motor as linear actuator arm and the brake pedal coupler extend or retract and generates a signal fed to the brake microcontroller that correlates or corresponds to the number of turns is from the fully retracted position that is correlated or corresponded to the applied force.

When retracting the linear actuator arm and the brake pedal coupler at the end of a braking cycle or as the amount of deceleration is decreased by easing off the towing vehicle braking system, the electric brake actuator drive motor retracts the linear actuator arm and brake pedal actuator reducing or eliminating the braking force on the brake pedal. The position of the linear actuator arm relative to the fully retracted position when no force is applied to the brake pedal is sensed either by the mechanical force sensor or revolutions registered by the motor encoder as an indication of the position or extension of the linear actuator arm related to the original or fully retracted position and corresponding applied force.

As initially stated any time the engine of the towed vehicle is operated after installation, set-up and initial vacuum purge; a vacuum in the vacuum assist brake system is created. Thus the vacuum must be purged again. To assure that the brake system is not operating with a vacuum, a engine sensing feature is provided to sense anytime the engine is operated or turned-over and to initiate a multi-cycle vacuum purge routine when the engine is not operating.

This summary is not intended to describe essential features of the claimed subject matter nor is it intended to limit the scope of the claimed subject matter. To the contrary, this summary merely outlines various concepts and features that are developed in the Detailed Description.

BRIEF DESCRIPTION OF THE DRAWINGS

For a fuller understanding of the nature and object of the invention, reference should be had to the following detailed description taken in connection with the accompanying drawings in which:

FIG. 4A-4D are side views of the brake pedal coupling device.

FIG. 7 is a detailed diagram of the brake microcontroller of the brake control.

FIG. 8 is a detailed diagram of the brake inertia sensor of the brake control.

FIG. 15 is a detailed diagram of the remote microcontroller of the remote control.

FIG. 16 is a detailed diagram of the graphic display of the remote control.

Similar reference characters refer to similar parts throughout the several views of the drawings.

DETAILED DESCRIPTION OF THE INVENTION

As previously stated, there is a potential that an auxiliary brake system installed in a towed vehicle may damage the vacuum assist brake system of the towed vehicle during a braking event if the vacuum is not purged. Thus it is important that after the vacuum purge is installed and set-up any vacuum created by operation or turn-over of the engine be purged from the vacuum assist brake system. For example, since the fluids of the towed vehicle must be circulated from time to time creates a vacuum. The vacuum should be periodically purged from such vacuum assist brake systems.

The present invention relates to a braking control system and method to synchronize the braking of a towed vehicle such as an automobile and a towing vehicle such as a motor home or recreational vehicle and to purge the vacuum from the vacuum assist brake system of the towed vehicle once installed and set-up to prevent damage to the brake system. In addition, the braking control system includes an engine sensing feature to sense whenever the engine is operated after set-up and to initiate a multi-cycle vacuum purge to again eliminate vacuum from the brake system of the towed vehicle.

Figure 1:
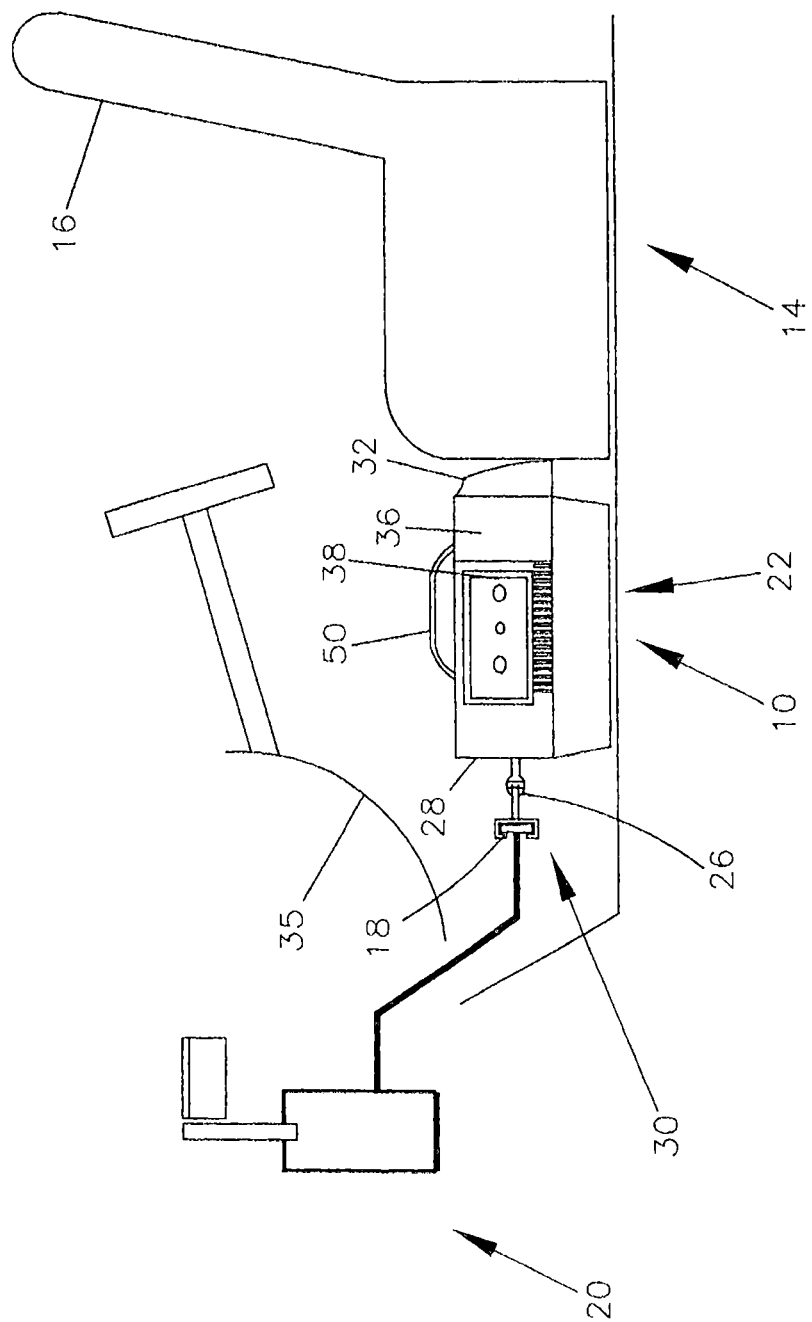
FIG. 1 is a side view of the braking device installed in a towed vehicle.

As shown in FIG. 1, the braking control system comprises a braking device 10 operatively located in a towed vehicle 14 between the driver's seat 16 and the brake pedal 18 coupled to the towed vehicle's vacuum power assisted hydraulic brake system generally indicated as 20.

Figure 3:
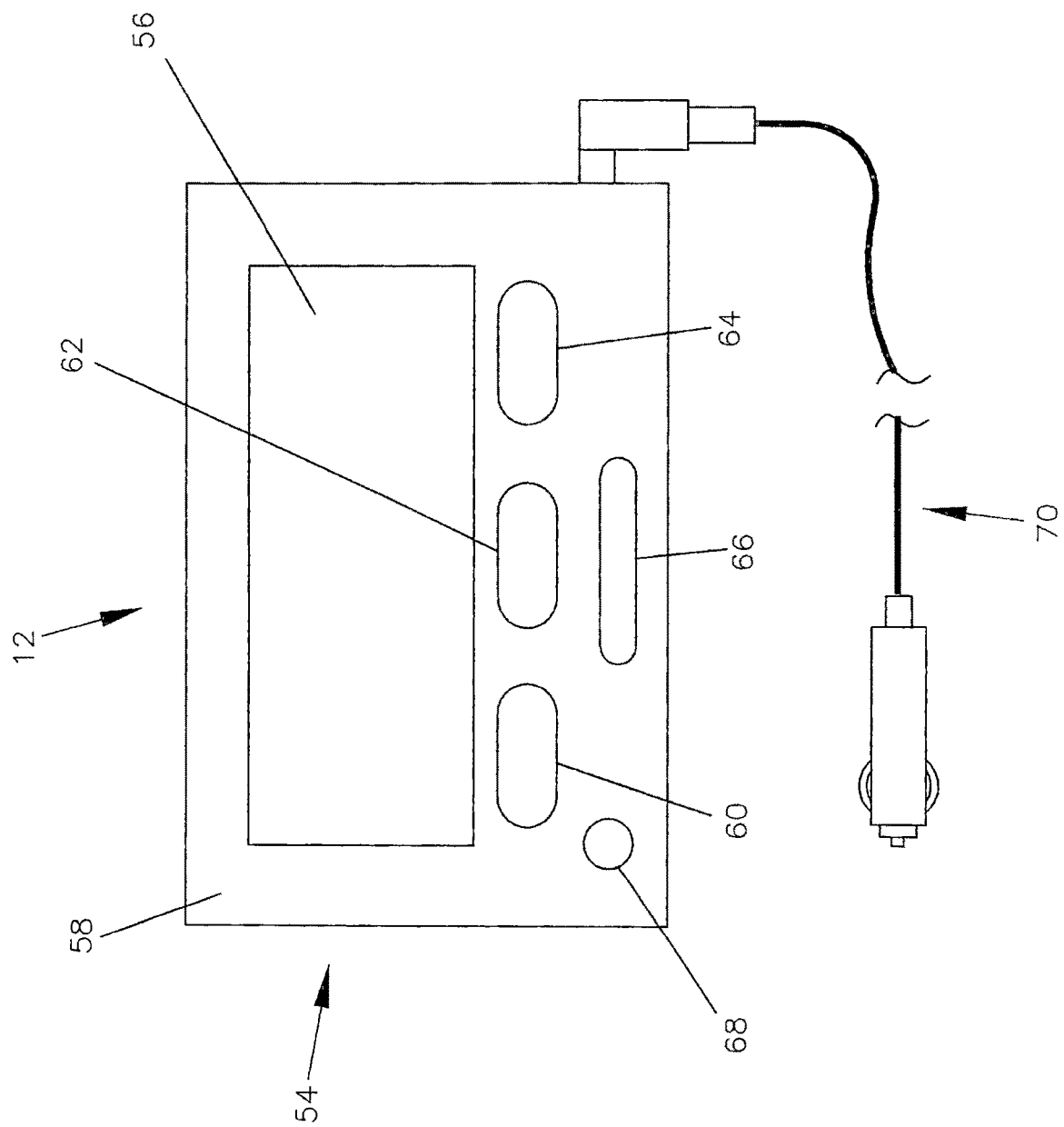
FIG. 3 is a front view of the remote device.

A remote device 12 as shown in FIG. 3 such as a portable device (hand held) is movable between the towed vehicle 14 during installation and set-up of the braking control system and the towing vehicle (not shown) when operating the brake control system during travel.

Figure 2:
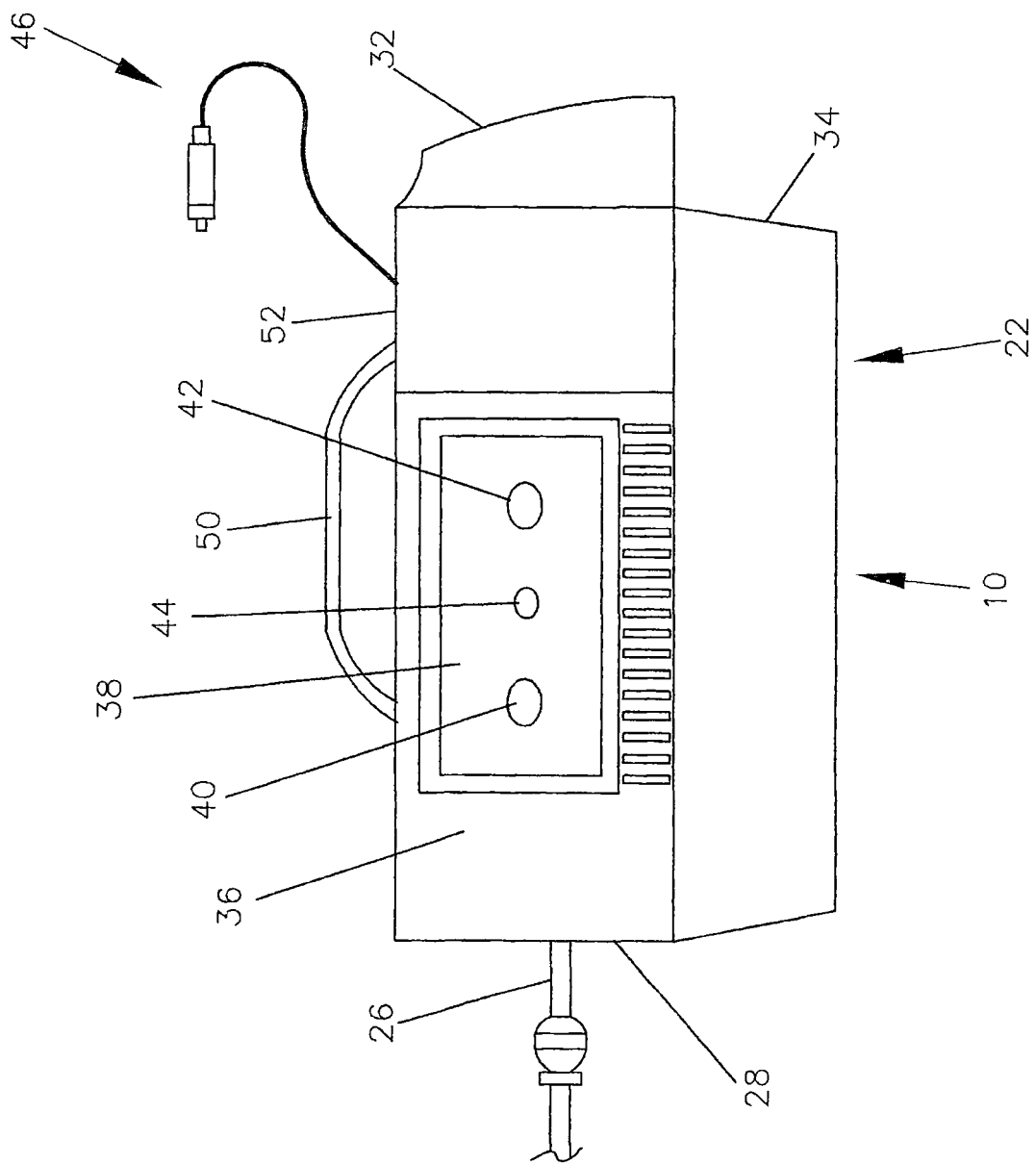
FIG. 2 is a side view of the braking device.
Figure 5:
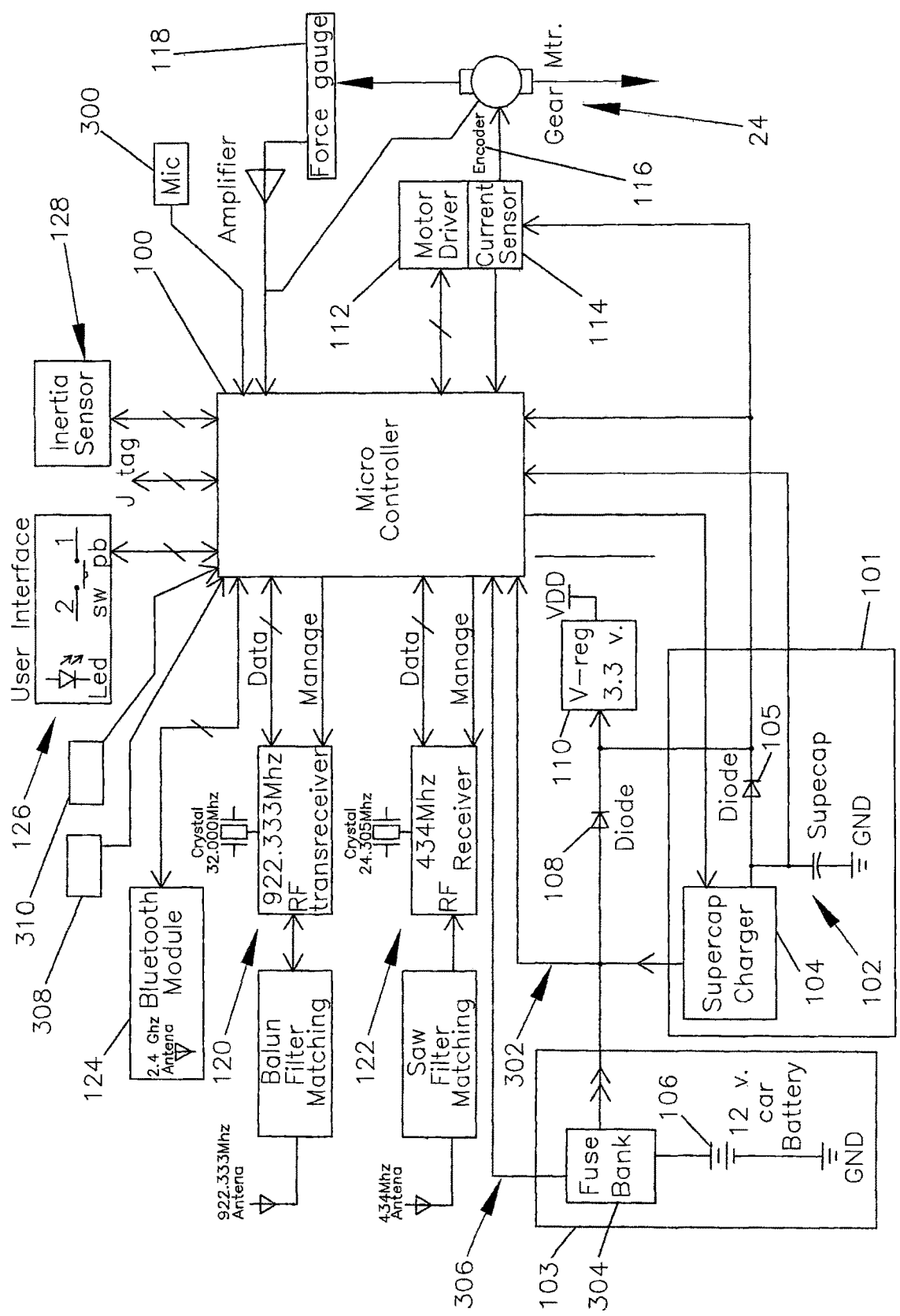
FIG. 5 is a block diagram of the brake control including the vacuum purge system.

As shown in FIGS. 1 and 2, the braking device 10 comprises a brake control enclosure or housing generally indicated as 22 to house a brake control including braking control electronics circuitry and processor software (FIG. 5) together with an electric actuator drive motor such as a nominal 12 volt brushed permanent magnet direct current motor generally indicated as 24 in FIG. 5.

As shown in FIG. 1, a linear actuator arm 26 selectively movable between a retracted position and extended position in response to various conditions extends outwardly from the front wall 28 of the brake control enclosure or housing 22 and coupled between the electric actuator drive motor 24 (FIG. 5) disposed within the brake control enclosure or housing 22 and a brake pedal coupler generally indicated as 30 disposed outside the brake control enclosure or housing 22 to secure the linear actuator arm 26 to the brake pedal 18 of the towed vehicle 14.

An adjustment pad 32 is mounted to the rear wall 34 of the brake control enclosure or housing 22 to provide means to adjust the position of the brake control enclosure or housing 22 and the adjustment pad 32 to accommodate the position of the driver's seat 16.

Figure 12:
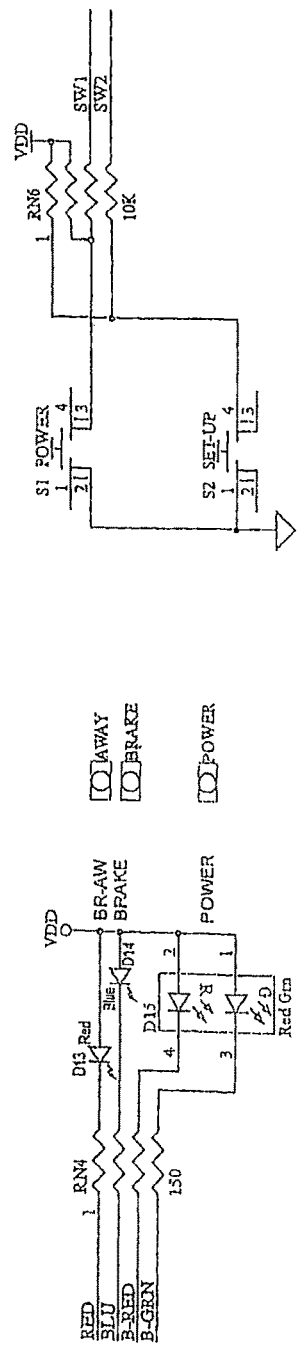
FIG. 12 is a detailed diagram of the brake interface of the brake control.
Figure 13:
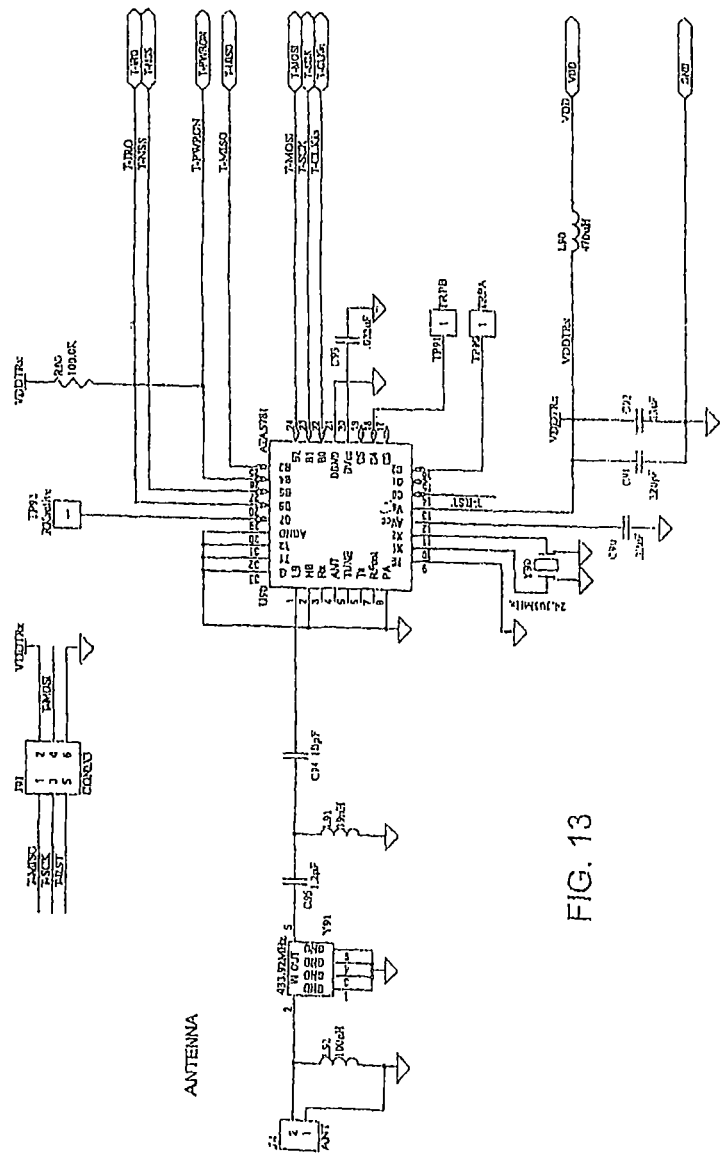
FIG. 13 is a detailed diagram of the brake receiver of the brake control.
Figure 14:
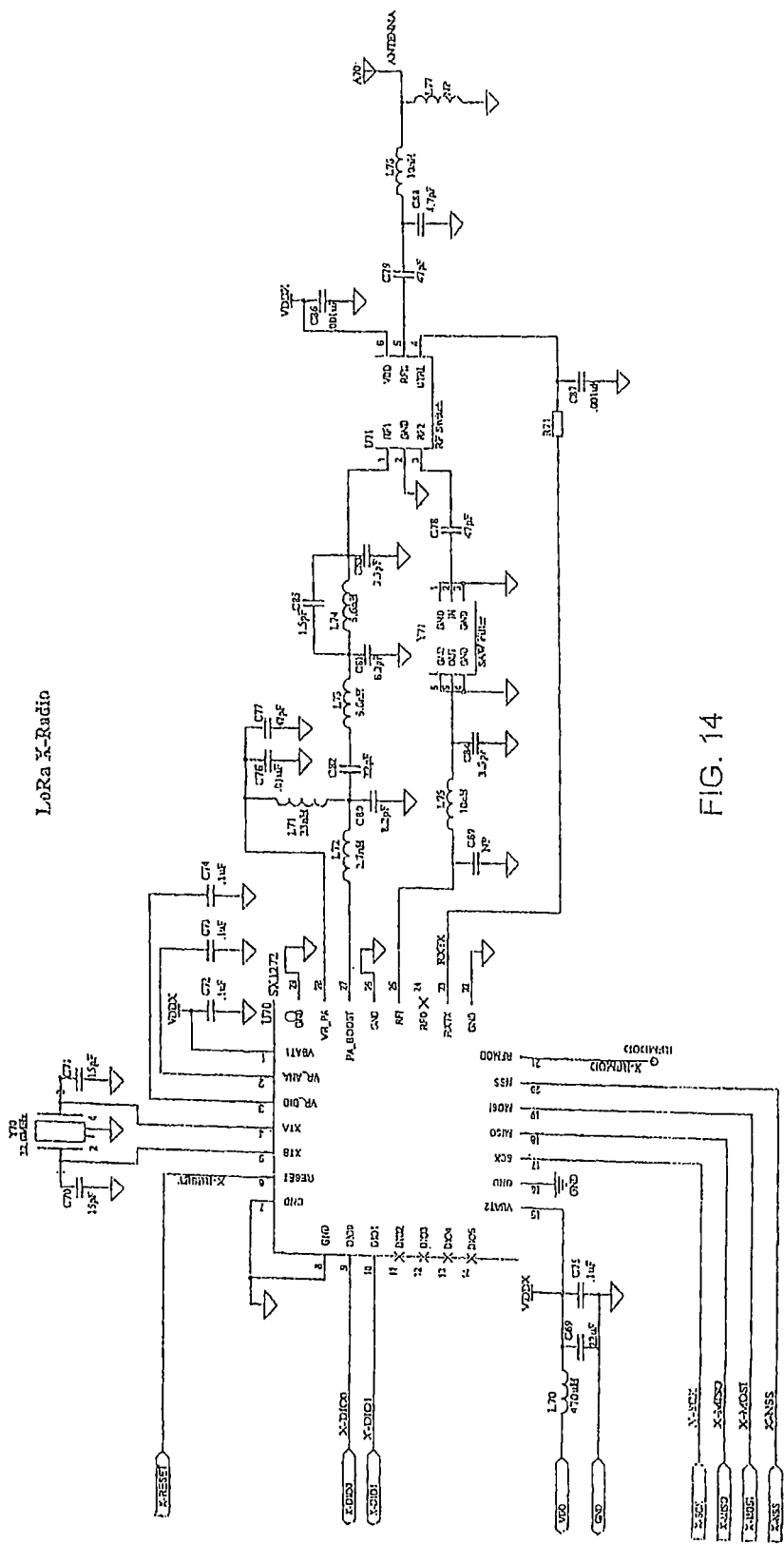
FIG. 14 is a detailed diagram of the brake transceiver of the brake control.
Figure 17:
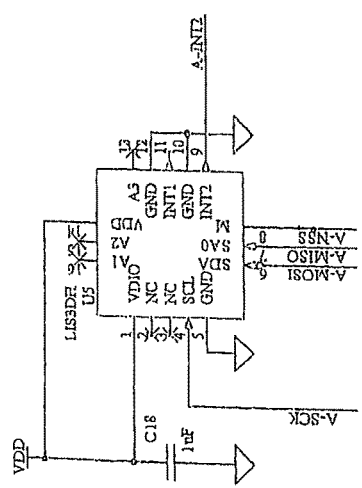
FIG. 17 is a detailed diagram of the remote inertia sensor of the remote control.
Figure 18:
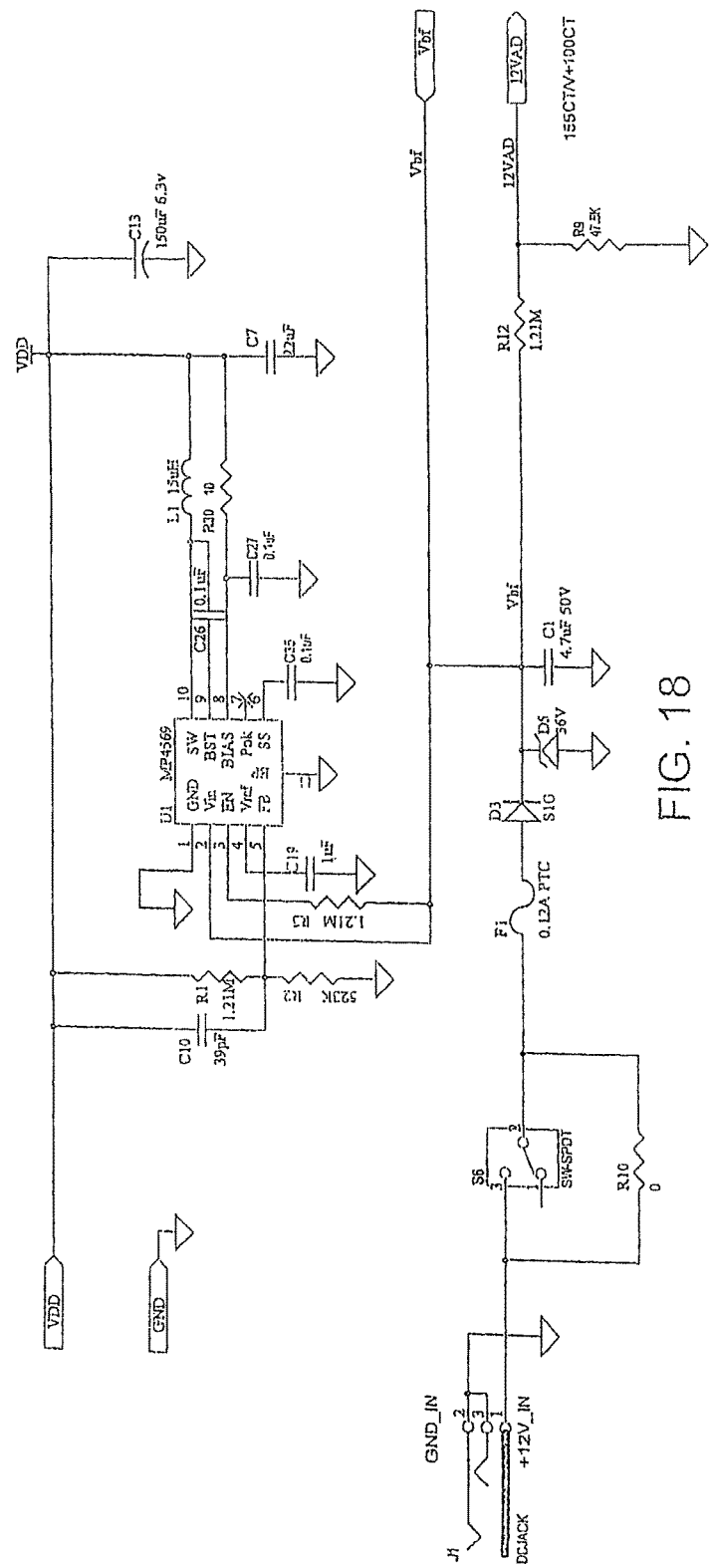
FIG. 18 is a detailed diagram of the remote power station of the remote control.
Figure 19:
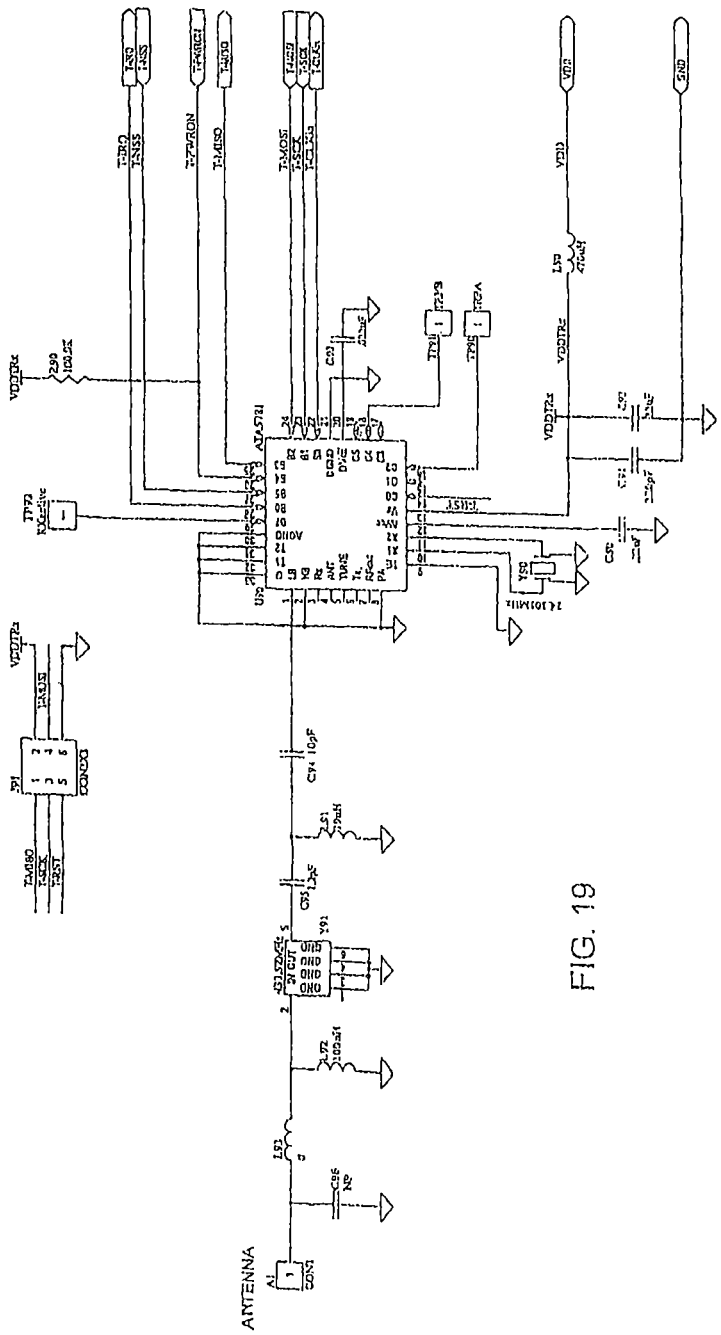
FIG. 19 is a detailed diagram of the remote receiver of the remote control.
Figure 20:
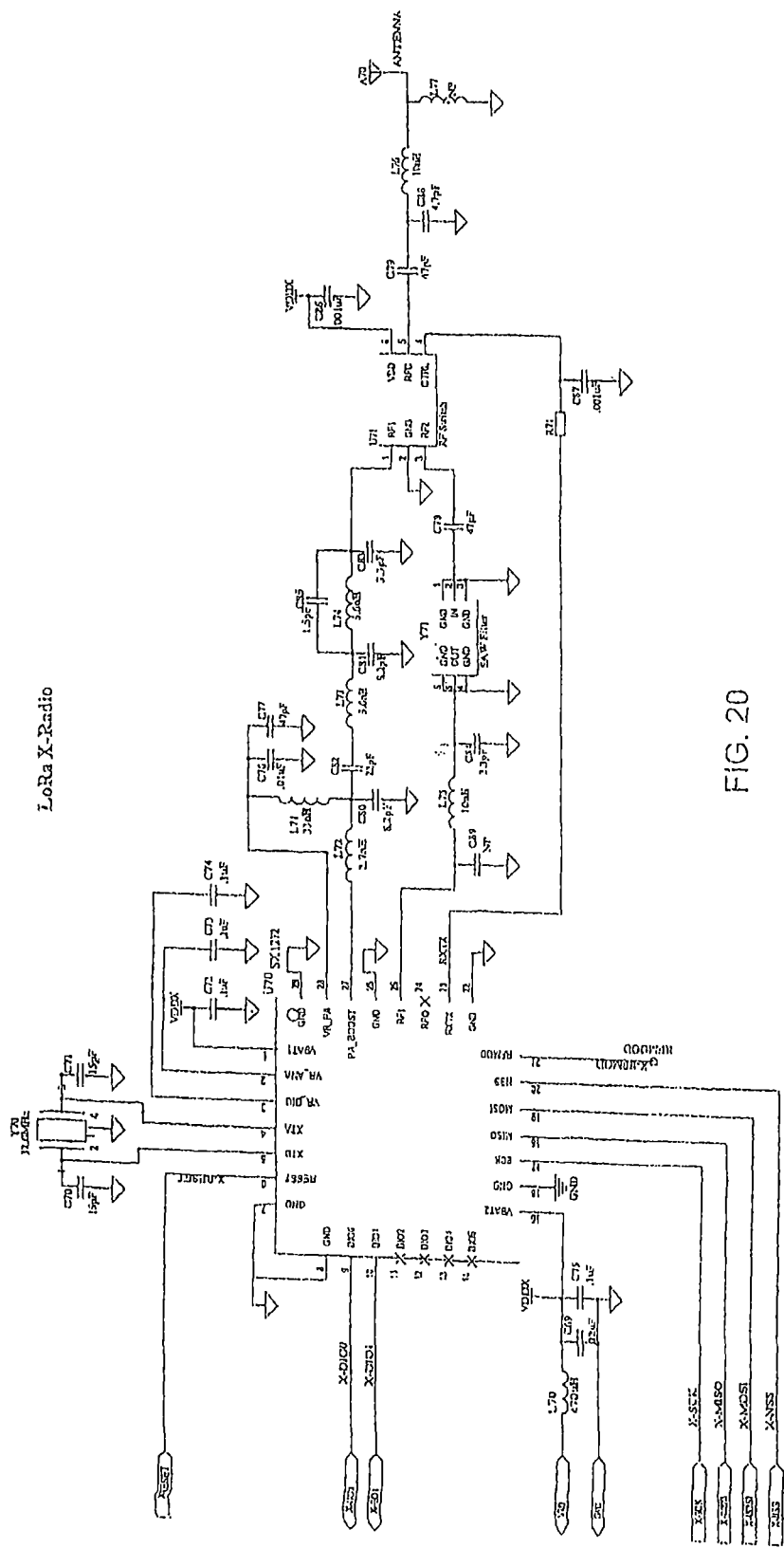
FIG. 20 is a detailed diagram of the remote transceiver of the remote control.

As shown in FIG. 12, formed on the side wall 36 of the brake control enclosure or housing 22 is a brake interface or input brake control panel 38 to support a setup button or switch 40 and a power button or switch 42 each of which is connected or coupled to the braking control electronics circuitry and processor software (FIG. 5). In addition, a towed vehicle break-away port 44 connected to the brake control is mounted to the brake control panel 38. A power supply connector and power cord together generally indicated as 46 is connected to the brake control enclosure or housing 22 to connect or couple the braking device 10 to the towed vehicle nominal 12 volt battery (FIG. 5). The braking device 10 may also include a carrying handle 50 formed on or affixed to a top wall 52 of the brake control enclosure or housing 22.

Figure 6:
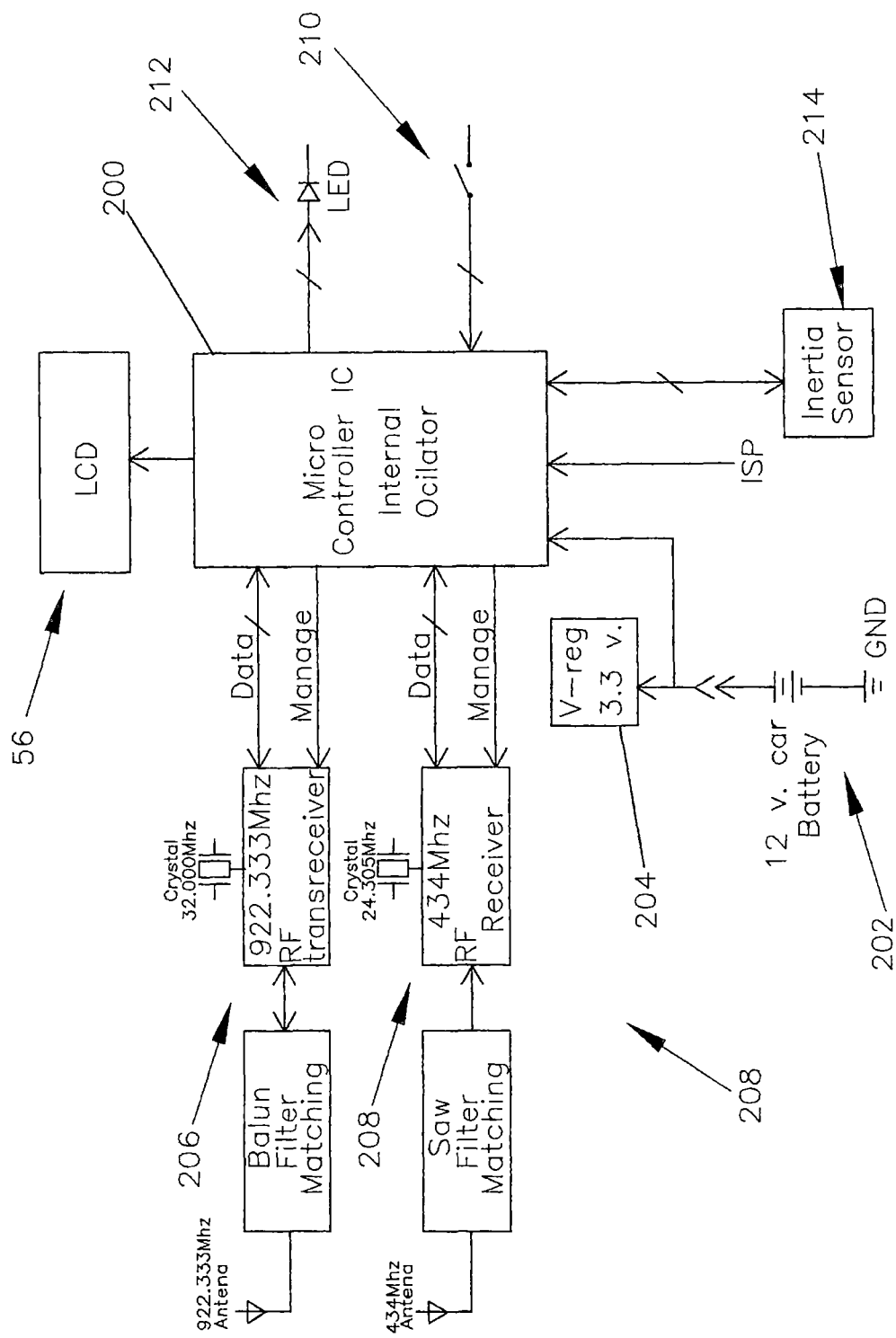
FIG. 6 is a block diagram of the remote control.
Figure 9:
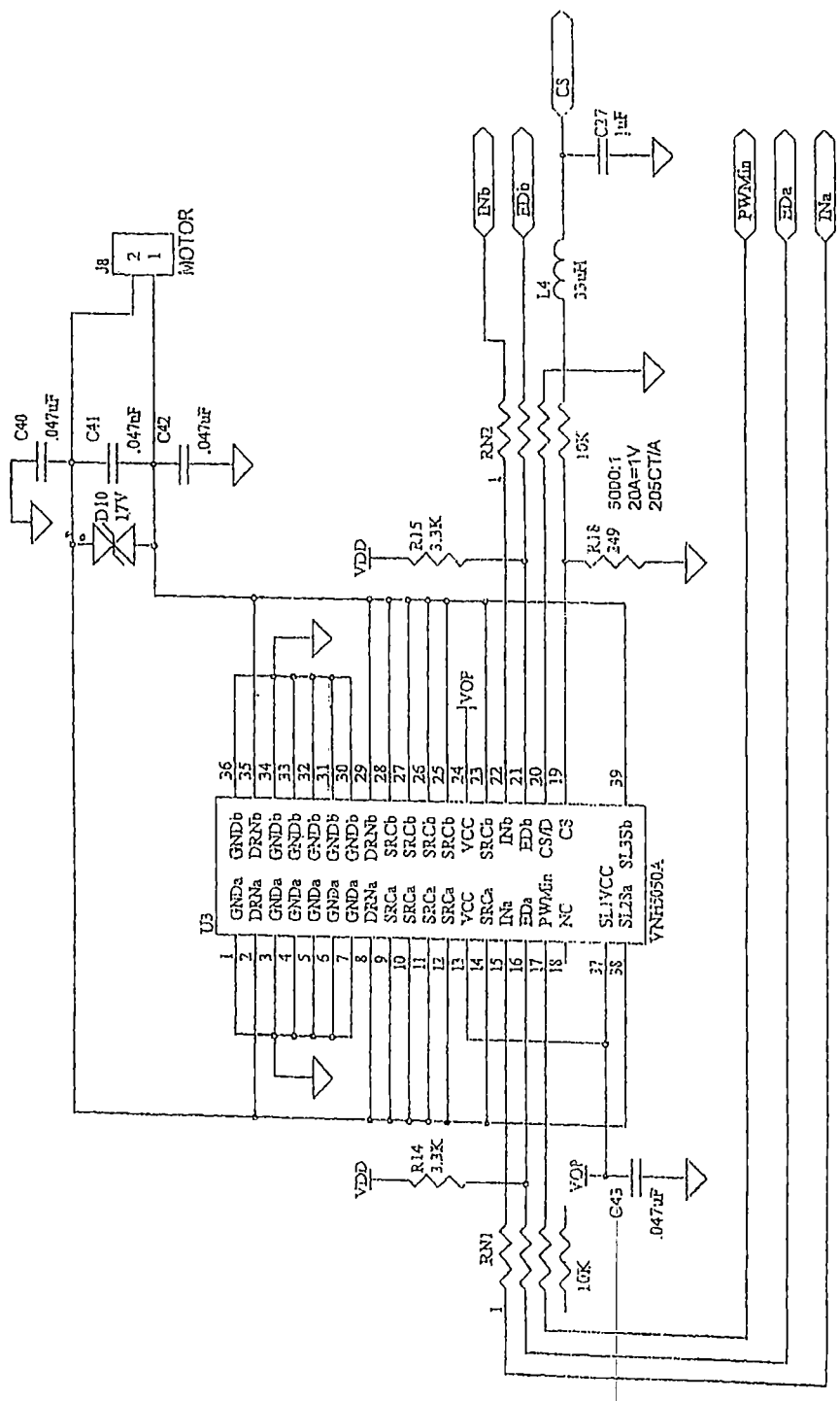
FIG. 9 is a detailed diagram of the motor driver/current sensor of the brake control.
Figure 10:
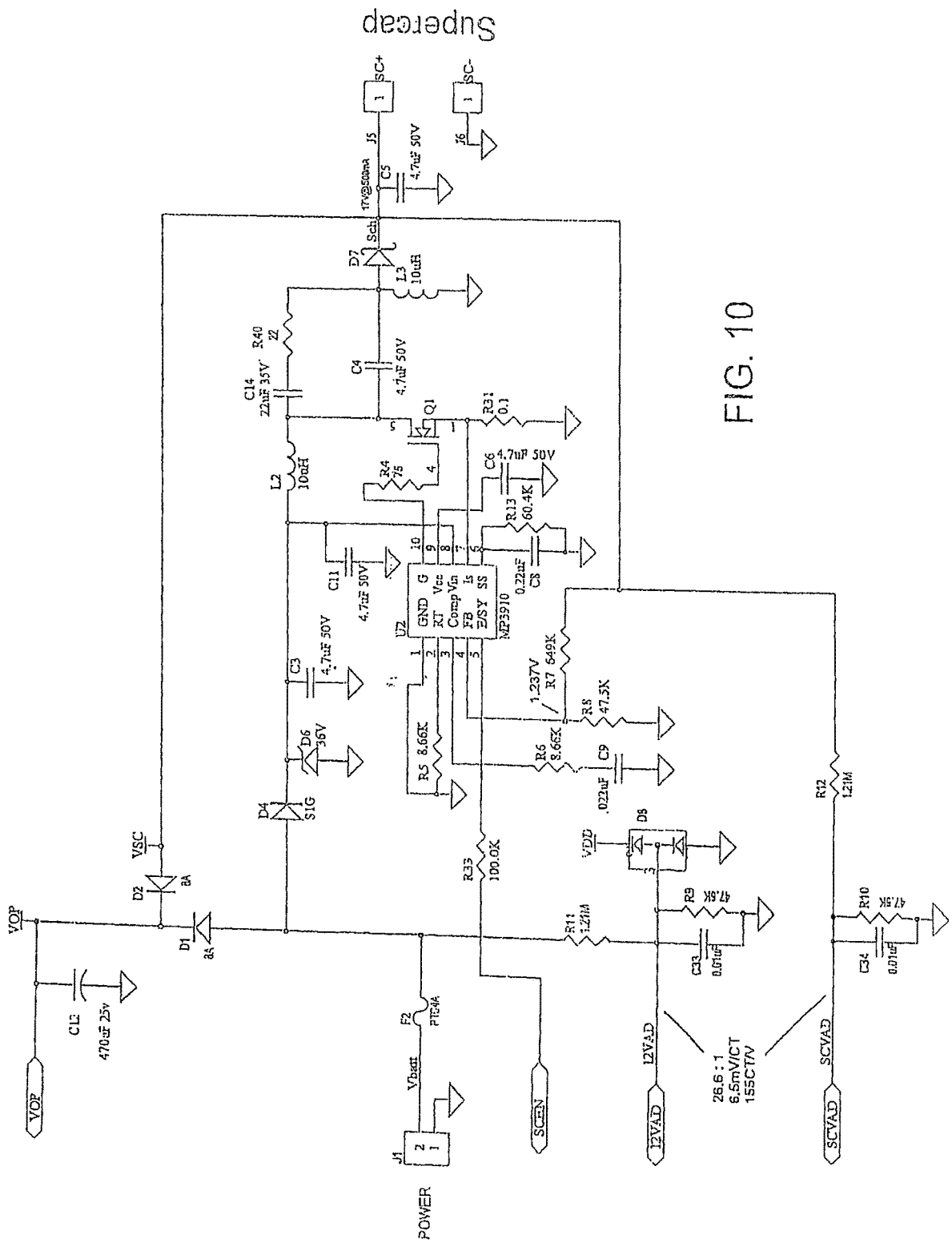
FIG. 10 is a detailed diagram of the supercapacitor charger of the brake control.
Figure 11:
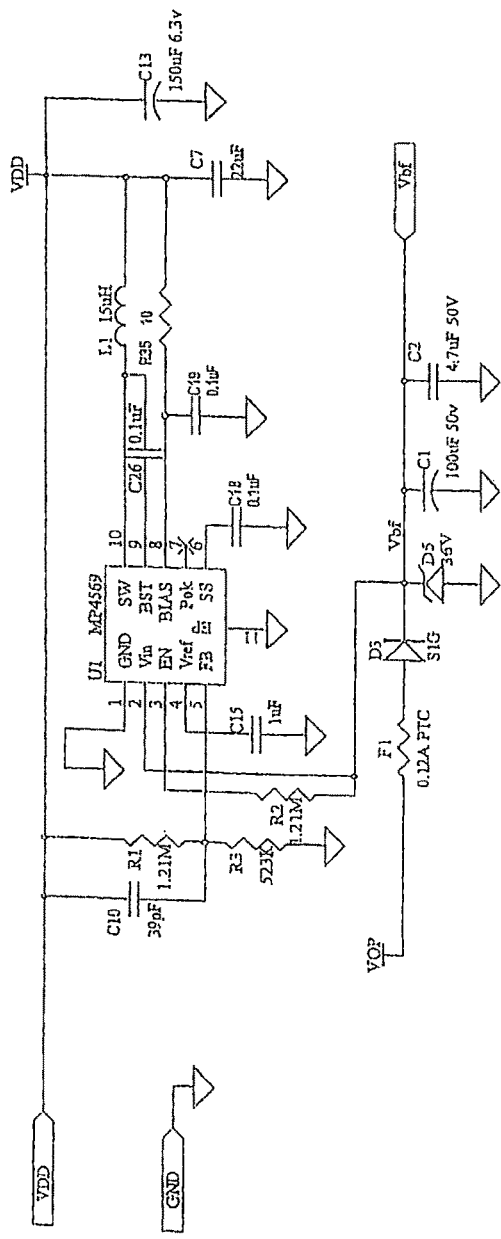
FIG. 11 is a detailed diagram of the brake voltage regulator of the brake control.

As shown in FIG. 3, the remote device 12 comprises a remote control housing or enclosure generally indicated as 54 to house remote control electronic circuitry and processor software (FIG. 6). The remote device 12 provides multiple data or information screens, remote display status of the hitch disconnect sensor status, tire pressure monitor status, remote braking control and system set-up functions. A graphic display 56 and a remote control interface comprising a plurality of control buttons or switches 60, 62 and 64 are positioned on a front panel 58 of the remote control housing or enclosure 54. The remote control interface provides input controls including braking device set-up configuration and selected braking system operating parameters. In addition, the remote control interface includes a manual brake control button or switch 66 to remotely actuate the linear actuator arm 26 of the braking device 10 of the braking control system.

Also shown in FIG. 3 is a speaker 68 mounted to the front panel 58 of the remote control housing or enclosure 54 to generate audible alert signals of operating conditions such as tire pressure warning or towed vehicle hitch disconnect event. In addition, a power cord and power receptacle adapter together generally indicated as 70 are connected or coupled to the remote control 12 to supply power from the towing vehicle nominal 12 volt battery (FIG. 6) to the remote device 12 when the remote device 12 is located in the towing vehicle (not shown).

As shown in FIGS. 4A through 4D, the brake pedal coupler 30 comprises an upper hollow coupler member or block 72 having at least one upper clamp member generally indicated as 74 affixed to the front wall thereof and a lower coupler member or block 76 having at least one lower clamp member generally indicated as 78 affixed to the front wall thereof. A spring biased coupling member or post generally indicated as 80 is attached to the lower coupler member or block 76 and is slidably disposed within the upper hollow coupler member or block 72.

A locking tab or knob generally indicated as 82 is rotatably attached to the side of the upper hollow coupler member or block 72 disposed to selectively engage the spring biased coupling member or post 80 to lock the lower clamp member 78 and lower coupler housing 76, and the upper clamp member 74 and upper hollow coupler member or block 72 relative to each other to secure the brake pedal coupler 30 to the brake pedal 18 of the towed vehicle 14.

The upper clamp member 74 and lower clamp member 78 each comprises a substantially straight proximal portion or leg 84 extending outwardly and substantially perpendicular to the front wall of the upper hollow coupler member or block 72 and the front wall of the lower coupler member or block 76 respectively and an angled or inclined distal portion or leg 86 forming an obtuse interior angle with the corresponding substantially straight proximal portion or leg 84. The angled or inclined distal portion or legs 86 of the upper clamp member 74 and the lower clamp member 78 are inclined toward each other to cooperatively form a jaw-like configuration to clamp or securely couple the brake pedal coupler 30 to the brake pedal 18 of the towed vehicle 14.

The brake pedal coupler 30 further includes a first lock release bottom 88 mounted on the top wall of the upper hollow coupler member or block 72 and a second lock release button 90 mounted to the front wall of the upper hollow coupler member or block 72 to release the spring biased coupling member or post 80 when manually depressed.

A pair of substantially parallel upper clamp members 74 and a pair of substantially parallel lower clamp members 78 may extend outwardly from the upper hollow coupler member or block 72 and the lower coupler member or block 76 respectively in a similar fashion to the single upper clamp member 74 and the lower clamp member 78 described above.

The upper clamp member 74 and lower clamp member 78 may be locked open or locked closed by rotation of the locking tab or knob 82 in a counter-clockwise direction (FIG. 4C) or a clockwise direction (FIG. 4D).

The spring biased coupling member or post 80 comprises an upper enlarged member 92 having a thumb tab 94 extending outwardly therefrom and a lower elongated threaded or notched member 96 extending downwardly from the lower portion of the upper enlarged member 92 to adjustably or movably couple the upper hollow coupler member or block 72 and the lower coupler member or block 76 together. A finger tab 98 extends outwardly from the upper hollow coupler member or block 72 that together with the thumb tab 94 facilitate adjustment of lower coupling member or block 76 relative to the upper hollow coupling member or block 72 to secure the brake pedal coupler 30 to the brake pedal 18 simply by squeezing the thumb and index finger together. Although the upper hollow coupler member or block 72 has been referred to as hollow, a channel (not shown) may be formed vertically through the upper coupler member or block 72 to slidably receive at least a portion of upper enlarged member 92 and at least a portion of the lower elongated threaded or notched member 96.

Extension and retraction of the linear actuator arm 26 by the electric brake actuator motor 24 to apply the braking force to the brake pedal 18 is controlled by the brake control to selectively depress and release the brake pedal 18 of the towed vehicle 14 proportionally or in synchronization with the towing vehicle (not shown) deceleration or acceleration as described hereinafter.

As depicted in FIG. 5, the brake control comprises a brake microcontroller 100 including digital and communication circuitry to receive and transmit signals to operate the electric actuator drive motor 24 and to communicate with the remote device 12 and tire pressure sensors (not shown) and hitch disconnect sensor (not shown).

In particular, the brake microcontroller 100 includes electronic components, logic circuitry and software to receive signals and power from the other elements and components of the braking device 10 and to generate control signals, status signals and operating signals fed to the various elements and components of the braking device 10 and to communicate with the remote device 12.

Power is supplied to the braking device 10 by a first or primary power source or energy storage device 101 and a second or secondary power source or energy storage device 103. The first or primary power source comprises a bank of supercapacitors generally indicated as 102 charged to a nominal 18 volts through a supercapacitor charger 104 and diode 105. The second or secondary power source 103 comprises a nominal 12 volt battery 106 such as the towed vehicle battery through a fuse bank 304 continuing through a steering diode 108 and a brake voltage regulator 110.

The boosted or increased supply voltage from the first or primary power source operates the electric actuator drive motor 24 at a significantly increased speed (revolutions per minute) increasing the speed of extension and retraction of the linear actuator arm 26 as the towing vehicle (not shown) and towed vehicle 14 decelerates or accelerates.

The electric brake actuator motor 24 is powered through an integrated motor driver circuit 112 controlled by the brake microcontroller 100. Power is supplied to the integrated motor driver integrated circuit 112 by the first or primary power source 101 and/or the second or secondary power source 103. The amount of current fed to the integrated motor driver integrated circuit 112 and, in turn, the electric brake actuator motor 24 is measured by a current sensor 114 coupled between the primary source 101 and secondary power source 103 and the integrated motor driver circuit 112. The current sensor 114 to also connected or coupled to the brake microcontroller 100 to fed real time current values to control the applied braking force. The system is designed or configured to operate at a constant current such as a nominal 6 amperes.

The nominal 12 volt battery 106, bank of supercapacitors 102, supercapacitor charger 104, integrated motor driver integrated circuit 112 and current sensor 114 are all coupled or connected to the brake microcontroller 100.

The position of the brake pedal coupler 30 and the linear actuator arm 26 relative to the fully retracted position directly correlates or corresponds to the applied braking force detected by an applied braking force detector implemented in one of several ways. For example, a motor encoder 116 senses and reads or counts the number of revolutions or turns of the electric brake actuator drive motor 24 when extending or advancing the linear actuator arm 26 from the fully retracted position to the linear position corresponding to the required applied braking force calculated by the brake microcontroller 100. The applied force corresponding to the G force sensed or measured by a brake inertia sensor 128 is directly related to the distance the brake pedal coupler 30 and the linear actuator arm 26 is extended from the fully retracted position.

The force applied to the brake pedal 18 is calculated by the brake microcontroller 100 by sensing the current drawn by the electric brake actuator drive motor 24.

In addition, the force applied on the brake pedal 18 by the brake pedal coupler 30 and the linear actuator arm 26 may be calculated by the brake microcontroller 100 as a function of the number of revolutions or turns of the electric actuator drive motor 24 counted by the motor encoder 116.

Alternately, a mechanical force sensor 118 such as a strain gauge mounted on the linear actuator arm 26 detects or senses directly the applied force exerted on the brake pedal 18 by the linear actuator arm 26. The applied force is fed to the brake microcontroller 100 to control the extension and retraction of the linear actuator arm 26 to the position corresponding to the calculated applied force relating to the G force measured by the brake inertia sensor 128. Of course, the mechanical force sensor 118 may be mounted on the linear actuator arm 26, brake pedal 18 or electric brake actuator drive motor 24 to sense the actual braking force exerted by the linear actuator arm 26 on the brake pedal 18.

Otherwise, as the force applied to the brake pedal (not shown) in the towing vehicle (not shown) increases or decreases, the electric brake actuator drive motor 24 extends or retracts the linear actuator arm 26 by rotating the number of revolutions or turns of the electric brake actuator drive motor 24 corresponding to the number of revolutions or turns corresponding to the real time applied force determined by the brake microcontroller 100. Alternately, as the towing vehicle (not shown) accelerates or decelerates, the brake inertia sensor 128 senses real time G force values exerted on the towed vehicle 14 and feeds a G force signal to the brake microcontroller 100 to extend or retract the linear actuator arm 26 and brake pedal coupler 30 to the linear position distance correlating to the current real time force corresponding to the measured or sensed real time G force.

A brake transceiver generally indicated as 120 is connected to the brake microcontroller 100 to exchange system configuration information and packet data with the remote device 12 to provide remote and network control.

A brake receiver generally indicated as 122 is connected to the brake microcontroller 100 to receive tire pressure measurements from the towed vehicle tires for transmission by the transceiver 120 to the remote device 12.

Periodically the remote device 12 transmits requests for status information or data packets to the braking device 10 that responds by transmitting the requested information or data as well as brake event information to the remote device 12.

A Bluetooth module 124 may be used to provide wireless computer connectivity. The Bluetooth module 124 communicates with the brake microcontroller 100 using serial data con ections and does not operate while the transceiver 120 is transmitting.

The brake interface or input control panel 38 including the setup button or switch 40, power button or switch 42 and LEDs is coupled to the brake microcontroller 100 to set-up and operate the braking device 10.

As previously described, the brake inertia sensor 128 such as an accelerometer is connected or coupled to the brake microcontroller 100 to sense and feed real time G-force information exerted on the towed vehicle 14 to the brake microcontroller 100 as the speed of the towed vehicle 14 increases or decreases as the speed of the towing vehicle (not shown) increases or decreases. In turn, the brake microcontroller logic and software generate the braking force to be applied to the brake pedal 18 as the linear actuator arm 26 and brake pedal coupler 30 are extended or retracted by the electric actuator drive motor 24.

As shown in FIG. 6, the remote device 12 comprises a remote microcontroller 200 including digital and communication circuitry to receive and transmit signals to monitor and selectively control the braking device 10. In particular, the remote microcontroller 200 includes electronic components, logic circuitry and software to receive signals and power from the other elements and components of the brake device 10 and to generate and transmit control signals, status signals and operating signals fed to the various elements of the braking device 10.

Power is supplied to the remote device 12 by a power source such as a nominal 12 volt battery generally indicated as 202 through a voltage regulator 204 such as the battery of the towing vehicle (not shown).

A remote transceiver generally indicated as 206 is connected to the remote microcontroller 200 to exchange configuration and a packet data with the braking control 10 through the brake transceiver 120 and to provide remote control of the braking device 10 including the electric actuator drive motor 24 and the linear actuator arm 26.

A remote receiver generally indicated as 208 is connected to the remote microcontroller 200 to receive tire pressure measurements from the towed vehicle tires directly or through the remote transceiver 206.

Digital packet and configuration data are communicated between the brake microcontroller 100 and the remote microcontroller 200 through the brake transceiver 120 and the remote transceiver 206 and the remote receiver 208. Periodically, data packets and switches events are also transmitted between the brake transceiver 120 and the remote transceiver 206.

A remote interface or control generally indicated as 210 coupled to remote manual brake button or switch 66 and to the control buttons or switches 60, 62 and 64 along with light emitting backlights 212 is coupled or connected to the circuitry and logic of the remote microprocessor 200.

A remote inertia sensor generally indicated as 214 such as an accelerometer is coupled to the remote microprocessor 200 to sense or measure the real time G-forces exerted on the remote device 12 as the towing vehicle (not shown) accelerates or decelerates to provide power management by energizing the remote device 12 on demand or only when needed.

The graphic display 56 comprises a liquid crystal diode screen with red, green and blue light emitting diode backlights 212 coupled to the remote microcontroller 200 to visually display system data or information. The graphic display 56 may selectively display a plurality of screens such as home screen, gain screen to set the gain from 1 to 9 as an example, manual brake screen, hitch break-away screen, configuration screen including device pairing, sets maximum force value, selects active braking mode, selects tpms enable, operation and screens, selects LCD background color and selects Bluetooth down-load, tpms screens, protected settings screen to set current sensor calibration and Bluetooth down-load screen.

Various system status information may be provided by at least one light emitting diode generally indicated as 216 emitting green to indicate fully operable, yellow for caution and red for fault. As previously stated, the remote manual brake button or switch 66 and remote control switches 60, 62 and 64 are connected or coupled to the remote microcontroller 200 through the switch portal 210.

Figure 4B:
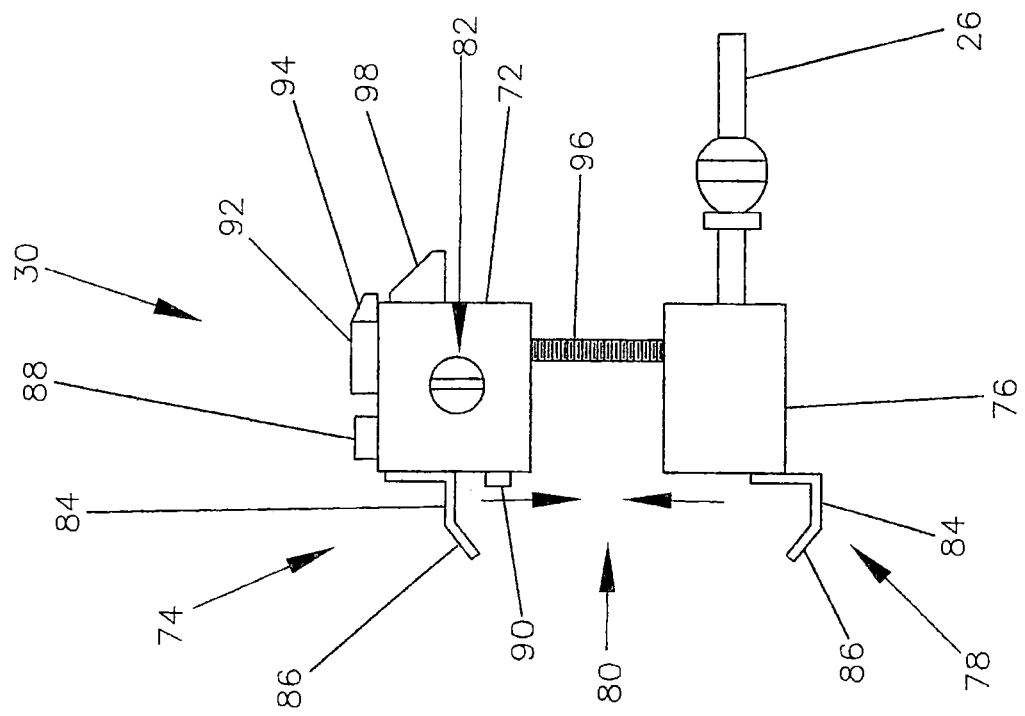
Figure 4A:
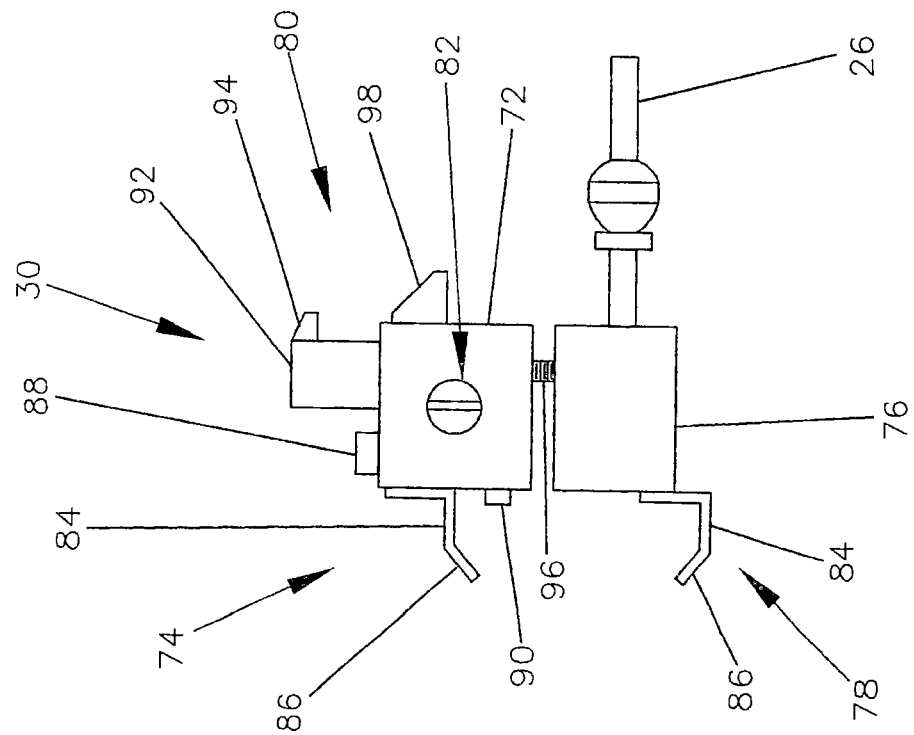

To install the braking device 10 in the towed vehicle 14 as depicted in FIG. 1, the driver's seat 16 is pushed back allowing space for the braking device 10 to be placed on the floor between the brake pedal 18 and the front of the driver's seat 16. The brake pedal coupler 30 is then secured to the brake pedal 18. Specifically, when the upper clamp member 74 and lower clamp member 78 are in the open position as shown in FIG. 4A, the brake pedal coupler 30 is placed on the brake pedal 18. The upper clamp member 74 and lower clamp member 78 are then closed or clamped onto the brake pedal 18 by squeezing or depressing the thumb tab 94 and finger tab 98 toward each other as indicated by the arrows in FIG. 4B until the upper clamp member 74 and lower clamp member 78 of the brake pedal coupler 30 securely engage and grasp the brake pedal 18. Once in position, either the first release button 88 or the second release button 90 is depressed. Finally, the upper clamp member 74 and lower clamp member 78 are locked in position relative to each other on the brake pedal 18 by rotating the locking knob 92 counterclockwise as shown in FIG. 4C. The upper clamp member 74 and lower clamp member 78 are unlocked by rotating the locking knob 92 clockwise as shown in FIG. 4D.

With the brake pedal coupler 30 secured to the brake pedal 18, the driver's seat 16 is moved forward against the adjustment pad 32 of the braking device 10. If necessary, the adjustment pad 32 may be adjusted toward or away from the rear wall of the brake control enclosure or housing 22. When the braking device 10 is properly positioned, the driver's seat 16 should not exert pressure on the braking device 10 or brake pedal 18.

Once the braking device 10 is properly positioned and secured in place, the power supply connector and power cord 46 are connected or coupled to the nominal 12 volt power receptacle (not shown) of the towed vehicle 14 causing an indicator light on the power cord 46 to illuminate.

Initially, when the setup button or switch 40 is depressed an indicator light associated with the setup button or switch 40 blinks repeatedly.

The braking device 10 is then configured using the remote control button(s) or switch(es) 60, 62 and 64 of the remote interface or control 210 and the graphic display 56 or brake interface or input brake control panel 38.

The first or primary power source 102 is charged by the second or secondary power source 106 through the supercapacitor charger 104. The supercapacitor charger 104 charges the first or primary power source 102 when towed vehicle battery is greater than about 10.5 volts to about a nominal 18.0 volts. When the charge or voltage of the supercapacitors 102 drops to about 16 nominal volts then the supercapacitor charger 104 is again enabled to recharge the first or primary power source to about a nominal 18 volts.

When the braking device 10 is configured and with power supplied to the brake device 10, the power button or switch 42 is depressed energizing the electric brake actuator motor 24 partially extending the linear actuator arm 26 from the fully retracted position depressing the brake pedal 18 to partially deplete a portion of the vacuum from the vacuum power assist brake system 20. At set-up, the linear actuator arm 26 cycles only once returning to the fully retracted position. In addition, the partial extension of the linear actuator arm 26 functions to verify that the brake actuator extension is within the range of motion.

After the braking device 10 is configured and set-up, a predetermined number of braking cycles apply only partial braking forces of the calculated applied braking force to further purge the vacuum power assist brake system.

Specifically, such an initial braking sequence may comprise:
  complete a first sequence of at least one (1) braking cycle at a first reduced or fractional braking force such as 30 pounds when the calculated braking force is 60 pounds in response to the measured G force.
  complete a second sequence of at least two (2) braking cycles at a second reduced or fractional braking force greater than the first reduced braking force but less than the calculated braking force of 60 pounds in response to the measured G force such as 45 pounds.
  after completing the first and second braking sequences the applied braking force such as 60 pounds is calculated or determined by the system logic and software and G force on the brake inertia sensor 128 during deceleration of the towing vehicle and towed vehicle 14.

A complete braking sequence comprises braking events; that is, extension of the linear actuator arm 26 depressing the brake pedal 30 where the motor current reaches the stop motor set point (braking force amount) without early braking termination.

Acceleration to initiate a braking event requires a minimum G force such as 0.05 G(s) for five (5) consecutive 20 ms periods dependent on gain programmed at set-up. This braking event qualification reduces or eliminates false braking that may result from traveling over railroad tracks, pot holes or similar occurrences.

If the towed vehicle hitch (not shown) is dislodged or broken, a braking force will be actuated. During a breakaway initiation, the graphic display 56 of the remote device 12 will display "BREAK-AWAY" with a red backlight and an audible alert alarm will be sounded or emitted by the speaker 68. The "BREAK-AWAY" indicator can be cleared by depressing one of the remote control interface controls 60, 62 or 64.

The amount of force applied by the linear actuator arm 26 and brake pedal coupler 30 to the brake pedal 18 is proportional to the deceleration G force sensed by the brake inertia sensor accelerometer 128. For example, if the maximum force capable of being applied at 1G is 90 pounds programmed into the brake microcontroller 100 by the remote control 12 then a 45 pound force will be applied to the brake pedal 18 at ½ G deceleration and a force of 67.5 pounds would be applied to the brake pedal 18 when the deceleration is ¾ G(s). The electronic circuitry and software of the brake microcontroller 100 calculates the amount of force that correlates to real time G force to be applied on the towed vehicle 14 and generates a control signal to the electric brake actuator drive motor 24.

The force applied by the brake device 10 to the brake pedal 18 is controlled by the amount of current fed to the electric brake actuator drive motor 24 through the integrated motor driver integrated circuit 112 of the brake microcontroller 100. The applied force is monitored real time or sensed by the force sensor that is either the mechanical force sensor 118 or by the motor revolution encoder 116 that senses the revolutions of the electric actuator drive motor 24 as linear actuator arm 26 and the brake pedal coupler 30 extend or retract and generates a signal fed to the brake microcontroller 100 that correlates the number of turns or revolutions of the electric brake actuator drive motor 24 is from the fully retracted position that is correlated to the applied force.

When retracting the linear actuator arm 26 and the brake pedal coupler 30 at the end of a braking cycle or as the amount of deceleration is decreased by easing off of the towing vehicle braking system, the electric brake actuator drive motor 24 retracts the linear actuator arm 26 and brake pedal actuator 30 reducing or eliminating the braking force on the brake pedal 18. The position of the linear actuator arm 26 relative to the fully retracted position when no force is applied to the brake pedal 18 is sensed either by the mechanical force sensor 118 or revolutions registered by the motor revolution encoder 116 as an indication of the position or extension of the linear actuator arm 26 related to the original or fully retracted position and corresponding applied force.

The first or primary power source 102 not only provides increased motor speed (rpm) but also assures that the linear actuator arm 26 and brake pedal coupler 30 can be fully retracted even if the second or secondary power source 106 is not sufficient to retract the linear actuator arm 26.

From time to time the engine of the towed vehicle 14 needs to be operated to circulate various fluids. In addition, there may be instances when the towed vehicle's engine is started or turned-over inadvertently. In either instance, a vacuum is created in the vacuum assist brake system of the towed vehicle 14. If the vacuum is not purged damage to the towed vehicle's brake system will likely result during a subsequent braking event.

When the engine of a towed vehicle is operated or turned-over after the initial vacuum purge an alert is generated that initiates a vacuum purge. To reduce the likelihood of damage to the towed vehicle's brake system due to the pressure of a vacuum, the braking control system further includes a method and system to initiate the vacuum purge.

As initially stated any time the engine of the towed vehicle is operated or turned-over after installation, set-up and vacuum purge; a vacuum is created in the vacuum assist brake system. Thus the vacuum must be purged again to avoid damage to the towed vehicle's brake system.

Specifically, engine sensing feature includes a plurality of sensors to detect or sense if the towed vehicle's engine has been operated or started after installation and set-up and generate corresponding signals fed to the microcontroller 100. These sensors:

monitor input voltage to detect a voltage profile of a predetermined voltage indicating the engine has been started or operated,
monitor engine ignition system to detect while the engine has been started or turned over,
monitor ambient sound for engine operation or turn-over,
monitor for vibration pattern to indicate engine start-up or turn-over,
monitor fuse bank to detect voltage change,
monitor engine temperature and
monitor pressure in vacuum assist brake system In addition, the engine sensor or monitoring system may further include a method of detecting engine operation by comparing the position of the linear actuation arm 26 with the force gauge 118 or current sensor 114 (FIG. 5).

As shown in FIG. 5 the engine sensing or monitoring system includes a sound sensor such as a microphone 300 to sense operation or turn-over of the engine and to generate a corresponding signal fed to the microcontroller 100 and a vibration sensing device such as accelerometer or inertia sensor 128 to sense or detect vibration characteristic of engine operation or turn-over and generate a corresponding signal fed to the microcontroller 100 to indicate engine operation or turn-over of the engine.

In addition, the towed vehicle battery 106 is coupled to the microcontroller 100 through conductor 302 to provide real time voltage levels of the towed vehicle battery 106. Also a fuse bank 304 is coupled to the microcontroller 100 through conductor 306 to provide voltage information to indicate whether or not the towed vehicle's ignition has been activated or initiated.

A temperature sensor 308 disposed to monitor the engine temperature is coupled to the microcontroller 100 to feed engine temperature data from the engine to the microcontroller 100. The microcontroller 100 includes logic and circuitry to generate a signal to activate the autonomous purge when the engine temperature equals or exceeds a predetermined value.

A pressure sensor 310 coupled to the microcontroller 100 senses the pressure in the vacuum assist and generate a signal when the pressure in the vacuum assist of the towed vehicle is equal to or less than a predetermined value.

The microprocessor 100 includes logic and software to process these signals and to initiate the purge when engine operation or turn-over has been detected or sensed by at least one of these sensors or components to purge the vacuum from the vacuum assist of the towed vehicle system after the auxiliary brake system has been installed and the vacuum assist initially purged.

Further the microprocessor 100 may include logic and software to process and compare the actuator force using force gauge 118 or actuator motor current measured by current sensor 114 to the actuator extension distance using encoder 116 sensor or actuator motor run time to detect whether the towed vehicle's engine is operating to provide reduced brake pedal actuation force or has operated to initiate the purge routine. One method of detecting when the towed vehicle engine is running is when the actuator extension distance is greater than when the towed vehicle's engine is not running and the towed vehicle brake vacuum is depleted for a fixed actuator force.

Similarly, a method of detecting whether the towed vehicle engine has operated since the last auxiliary brake use is when the actuator extension distance is greater from and ramps towards equivalence of actuator extension distance to a fixed actuator force when the towed vehicle's engine is not running and brake vacuum is depleted.

Alternatively, for both previous methods and the determination may be performed by comparing to fixed actuator extension distance to a range of variable actuator forces. In addition, any combination of towed vehicle running and towed vehicle engine has ran since last auxiliary brake use, towed vehicle brake vacuum detection methods and sensors may be used for optimal auxiliary brake operation.

In addition, the engine sensing or monitoring system may include logic and circuitry to detect whether the engine is operating or running during set-up of the auxiliary brake system and prevent set-up from continuing. The remote device 12 is signaled the condition of the engine is operating and then displays the engine running information.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

In describing the invention, certain terms are used for brevity, clarity, and understanding. No unnecessary limitations should be inferred beyond the requirement of the prior art because such terms are used for descriptive purposes and are intended to be broadly construed. The different structural and functional elements, apparatuses, devices, compositions, and methods described herein may be used alone or in combination with other structural and functional elements, apparatus, devices, compositions, systems and methods. It is to be expected that various equivalents, alternatives and modifications are possible.

What is claimed is:

1. An auxiliary brake system to control the operation of the brake system of a towed vehicle having logic and circuitry to autonomously purge the vacuum from the vacuum assist brake system of the towed vehicle after the auxiliary brake system is installed and initially purged during set-up in the towed vehicle, the auxiliary brake system includes an engine monitoring system having at least one sensor to sense and generate an engine operation signal of at least one engine operating condition of the towed vehicle indicating engine operation of the auxiliary brake system in the towed vehicle after the auxiliary brake system is installed and the vacuum assist of the towed vehicle is initially purged during set-up wherein said engine operation signal is fed to a controller to actuate a linear actuator of the auxiliary brake system of the towed vehicle increasing the braking force of the auxiliary brake system on each successive braking event of the towed vehicle until the vacuum assist brake system is purged such that the combined braking force applied to the brake pedal of the towed vehicle of the auxiliary brake system by said linear actuator and the force from the vacuum assist brake system of the towed vehicle during each cycle of the brake pedal of the towed vehicle does not exceed the maximum braking force of the braking system of the towed vehicle to purge the vacuum created in the vacuum assist brake system of the towed vehicle brake system after the engine has been operated.

2. An auxiliary brake system to control the operation of the brake system of a towed vehicle having logic and circuitry to autonomously purge at least a portion of the vacuum from the vacuum assist brake system of the towed vehicle after the auxiliary brake system is installed in the towed vehicle and the vacuum assist brake system during set-up is initially purged, the auxiliary brake system includes an engine monitoring system having at least one sensor to sense and generate an engine operation signal of at least one engine operating condition of the towed vehicle indicating engine operation after installation of the auxiliary brake system in the towed vehicle after the auxiliary brake system is installed and the vacuum assist brake system during set-up is initially purged wherein said engine operation signal is fed to a controller to initiate a vacuum purge of the vacuum assist brake system of the towed vehicle brake system when the engine has operated the auxiliary braking system includes an accelerometer to sense the deceleration of the towed vehicle during a braking event of the towed vehicle and to generate a corresponding accelerometer signal and a linear actuator movable between a retracted position and an extended position coupled between an actuator drive and the brake pedal of the towed vehicle and a control device including a microcontroller having circuitry and software coupled to said accelerometer to calculate a braking force corresponding to the accelerometer signal and coupled to said sensor to receive said engine operation signal and to generate an actuation signal fed to said actuator drive to actuate said linear actuator to extend said linear actuator to depress the brake pedal of the towed vehicle during a braking event to at least partially evacuate a portion of the vacuum assist to reduce the force applied by said linear actuator to the brake pedal such that the force applied to the brake pedal and the force from the vacuum assist does not exceed the maximum braking force of the braking system of the towed vehicle and then to retract said linear actuator to release the brake pedal of the towed vehicle.

3. The auxiliary brake system of claim 2 wherein said actuator drive extends said linear actuator a distance greater than the first extension of said of said linear actuator to apply a second braking force against the brake pedal greater than the first braking force against the brake pedal of the towed vehicle to further evacuate the vacuum assist such that the combined braking force of said second braking force and the force from the vacuum assist does not exceed the maximum braking force of the braking system of the towed vehicle and then retracts said linear actuator releasing the brake pedal of the towed vehicle.

4. The auxiliary brake system of claim 3 wherein said actuator drive extends said linear actuator a distance greater than the second extension of said linear actuator to apply an additional braking force against the brake pedal greater than said second braking force against the brake pedal of the towed vehicle to further evacuate the vacuum assist to further reduce or eliminate the vacuum assist of the braking system of the towed vehicle.

5. The auxiliary brake system of claim 2 wherein said sensor comprises a sound sensor to sense operation of the engine and to generate said signal fed to said microprocessor to indicate engine operation of the engine after installation of the auxiliary brake system.

6. The auxiliary brake system of claim 5 wherein said sensor comprises a microphone to sense operation of the engine and to generate said signal fed to said microprocessor to indicate engine operation of the engine after installation of the auxiliary brake system.

7. The auxiliary brake system of claim 2 wherein said sensor comprises a vibration sensor to sense operation of the engine and to generate said signal fed to said microprocessor to indicate engine operation of the engine after installation of the auxiliary brake system.

8. The auxiliary brake system of claim 7 wherein said sensor comprises an accelerometer to sense operation of the engine and to generate said signal fed to said microprocessor to indicate engine operation of the engine after installation of the auxiliary brake system.

9. The auxiliary brake system of claim 2 wherein said sensor profile comprises a voltage sensor to sense operation of the engine and to generate said corresponding signal fed to said microprocessor to indicate engine operation of the engine after installation of the auxiliary brake system.

10. The auxiliary brake system of claim 2 wherein said sensor comprises an engine ignition system sensor to sense activation of the engine ignition of the engine and to generate said corresponding signal fed to said microprocessor to indicate engine operation or turn-over of the engine.

11. The auxiliary brake system of claim 2 wherein said sensor comprises a temperature sensor disposed to monitor the engine temperature coupled to said microcontroller to feed engine temperature data from the engine to said microcontroller, said microcontroller includes logic and circuitry to generate a signal to activate the autonomous purge when the engine temperature equals or exceeds a predetermined value.

12. The auxiliary braking system of claim 2 wherein said sensor comprises a pressure sensor coupled to said microcontroller to sense the pressure in the vacuum assist and generate a signal when the pressure in the vacuum assist of the towed vehicle is equal to or less than a predetermined value.

13. The auxiliary braking system of claim 2 wherein said auxiliary braking system comprises a plurality of sensors to sense and generate a corresponding plurality of signals of engine operation.

14. The auxiliary brake system of claim 13 said a plurality of sensors to sense and generate said corresponding operational signals of engine operations comprises a second sensor, vibration sensor, heat sensor, pressure sensor, voltage sensor or any combination thereof and to generate corresponding operational signals of engine operation.

15. An auxiliary brake system to control the operation of the brake system of a towed vehicle having logic and circuitry to autonomously purge at least a portion of the vacuum from the vacuum assist brake system of the towed vehicle after the auxiliary brake system is installed in the towed vehicle and initially purged during set-up, the auxiliary brake system includes an engine monitoring system to generate an engine operation signal indicating operation of the engine of the towed vehicle of the auxiliary brake system in the towed vehicle after the auxiliary brake system is installed and initially purged wherein said engine operation signal is fed to a controller to initiate a vacuum purge of the vacuum assist brake system of the towed vehicle brake system to incrementally purge the vacuum created in the vacuum assist brake system of the towed vehicle by increasing the braking force exerted by the auxiliary braking system on the braking system on successive braking events of the towed vehicle when the engine has operated after installation and initial purging of the vacuum brake system in the towed vehicle during set-up.

16. The auxiliary brake system of claim 15 further includes an actuation arm to actuate the brake pedal of the towed vehicle and a force gauge to sense the amount of force applied by the actuation arm on the brake pedal to generate an engine operation signal.

17. The auxiliary brake system of claim 15 further includes a current sensor to sense the current of a drive motor coupled to an actuation arm that actuates the brake pedal of the towed vehicle to generate an engine operation signal.

18. An auxiliary brake system for use in a towed vehicle coupled to the brake system of the towed vehicle to actuate the brake system of the towed vehicle during a braking event of a towing vehicle, the auxiliary brake system includes an engine monitoring system having at least one sensor to sense and generate an engine operation signal of at least one engine operating condition of the towed vehicle indicating engine operation of the towed vehicle, said engine operation signal being fed to a controller including logic and circuitry to generate a control signal to prevent activation of the auxiliary brake system during installation and set-up of the auxiliary brake system when the engine of the towed vehicle is operating.

\* \* \* \* \*